United States Patent
Sugio et al.

(10) Patent No.: US 10,536,712 B2
(45) Date of Patent: *Jan. 14, 2020

(54) MOVING PICTURE CODING METHOD, MOVING PICTURE CODING APPARATUS, MOVING PICTURE DECODING METHOD, MOVING PICTURE DECODING APPARATUS AND MOVING PICTURE CODING AND DECODING APPARATUS

(71) Applicant: Sun Patent Trust, New York, NY (US)

(72) Inventors: Toshiyasu Sugio, Osaka (JP); Takahiro Nishi, Nara (JP); Youji Shibahara, Tokyo (JP); Hisao Sasai, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/232,441

(22) Filed: Dec. 26, 2018

(65) Prior Publication Data

US 2019/0132607 A1 May 2, 2019

Related U.S. Application Data

(60) Continuation of application No. 15/836,120, filed on Dec. 8, 2017, now Pat. No. 10,178,404, which is a
(Continued)

(51) Int. Cl.
*H04N 19/513* (2014.01)
*H04N 19/56* (2014.01)
(Continued)

(52) U.S. Cl.
CPC ......... *H04N 19/513* (2014.11); *H04N 19/105* (2014.11); *H04N 19/503* (2014.11);
(Continued)

(58) Field of Classification Search
CPC .... H04N 19/513; H04N 19/105; H04N 19/52; H04N 19/56; H04N 19/503;
(Continued)

(56) References Cited

U.S. PATENT DOCUMENTS 5,905,535 A 5/1999 Kerdranvat
5,995,080 A 11/1999 Biro et al.
(Continued)

FOREIGN PATENT DOCUMENTS

CN 1525762 9/2004
CN 1537390 10/2004
(Continued)

OTHER PUBLICATIONS

ITU-T Recommendation H.264, "Advanced video coding for generic audiovisual services", Mar. 2010.
(Continued)

*Primary Examiner* — Allen C Wong
(74) *Attorney, Agent, or Firm* — Wenderoth, Lind & Ponack, L.L.P.

(57) ABSTRACT

By the moving picture coding method and the moving picture decoding method, it is possible to improve coding efficiency. The moving picture coding apparatus includes a merge block candidate calculation unit that (i) specifies merge block candidates at merge mode, by using colpic information such as motion vectors and reference picture index values of neighbor blocks of a current block to be coded and a motion vector and the like of a collocated block of the current block which are stored in a colPic memory, and (ii) generates a combined merge block by using the merge block candidates.

6 Claims, 30 Drawing Sheets

Related U.S. Application Data continuation of application No. 15/219,525, filed on Jul. 26, 2016, now Pat. No. 9,872,036, which is a continuation of application No. 14/612,535, filed on Feb. 3, 2015, now Pat. No. 9,445,120, which is a division of application No. 13/441,994, filed on Apr. 9, 2012, now Pat. No. 8,982,953.

(60) Provisional application No. 61/474,507, filed on Apr. 12, 2011.

(51) Int. Cl.
| | |
|---|---|
| *H04N 19/105* | (2014.01) |
| *H04N 19/52* | (2014.01) |
| *H04N 19/503* | (2014.01) |
| *H04N 19/577* | (2014.01) |
| *H04N 19/573* | (2014.01) |
| *H04N 19/70* | (2014.01) |
| *H04N 19/107* | (2014.01) |
| *H04N 19/109* | (2014.01) |

(52) U.S. Cl.
CPC ............. *H04N 19/52* (2014.11); *H04N 19/56* (2014.11); *H04N 19/573* (2014.11); *H04N 19/577* (2014.11); *H04N 19/107* (2014.11); *H04N 19/109* (2014.11); *H04N 19/70* (2014.11)

(58) Field of Classification Search
CPC .. H04N 19/577; H04N 19/573; H04N 19/107; H04N 19/109; H04N 19/70
USPC ...................................... 375/240.16
See application file for complete search history.

(56) References Cited

U.S. PATENT DOCUMENTS

| | | | |
|---|---|---|---|
| 6,192,080 B1 | 2/2001 | Sun et al. | |
| 6,192,148 B1 | 2/2001 | Lin | |
| 6,424,676 B1 | 7/2002 | Kono et al. | |
| 6,427,027 B1 | 7/2002 | Suzuki et al. | |
| 6,594,313 B1 | 7/2003 | Hazra et al. | |
| 6,795,499 B1 | 9/2004 | Kato et al. | |
| 6,842,483 B1 | 1/2005 | Au et al. | |
| 7,154,952 B2 | 12/2006 | Tourapis et al. | |
| 7,266,147 B2 | 9/2007 | Deshpande | |
| 7,301,482 B1 | 11/2007 | Oberg | |
| 7,372,905 B2 | 5/2008 | Foo et al. | |
| 7,394,851 B2 | 7/2008 | Kato et al. | |
| 7,660,354 B2 | 2/2010 | Shi et al. | |
| 7,664,180 B2 | 2/2010 | Kondo et al. | |
| 7,680,186 B2 | 3/2010 | Lee et al. | |
| 7,697,783 B2 | 4/2010 | Lee et al. | |
| 7,702,168 B2 | 4/2010 | Thoreau et al. | |
| 7,742,526 B2 | 6/2010 | Kondo et al. | |
| 7,746,929 B2 | 6/2010 | Valente | |
| 7,801,219 B2 | 9/2010 | Kondo et al. | |
| 7,835,436 B2 | 11/2010 | Aridome et al. | |
| 7,852,936 B2 | 12/2010 | Mukerjee et al. | |
| 7,856,060 B2 | 12/2010 | Kondo et al. | |
| 7,940,845 B2 | 5/2011 | Kondo et al. | |
| 8,005,144 B2 | 8/2011 | Ji et al. | |
| RE43,062 E | 1/2012 | Deshpande | |
| 8,175,444 B2 | 5/2012 | Kang et al. | |
| 8,180,201 B2 | 5/2012 | Kang et al. | |
| 8,190,003 B2 | 5/2012 | Kang et al. | |
| 8,208,541 B2 | 6/2012 | Iguchi et al. | |
| 8,208,544 B2 | 6/2012 | Song et al. | |
| 8,249,147 B2 | 8/2012 | Watanabe | |
| 8,275,235 B2 | 9/2012 | Kang et al. | |
| 8,325,819 B2 | 12/2012 | Karczewicz | |
| 8,355,438 B2 | 1/2013 | Shimizu et al. | |
| 8,374,245 B2 | 2/2013 | Tourapis et al. | |
| 8,379,722 B2 | 2/2013 | Tourapis et al. | |
| 8,396,344 B2 | 3/2013 | Kang et al. | |
| 8,538,248 B2 | 9/2013 | Kang et al. | |
| 8,542,977 B2 | 9/2013 | Kang et al. | |
| 8,565,314 B2 | 10/2013 | Karczewicz et al. | |
| 8,599,926 B2 | 12/2013 | Karczewicz | |
| 8,670,486 B2 | 3/2014 | Hannuksela | |
| 8,675,735 B2 | 3/2014 | Shimizu et al. | |
| 8,718,141 B2 | 5/2014 | Kondo et al. | |
| 8,761,258 B2 | 6/2014 | Au et al. | |
| 8,774,280 B2 | 7/2014 | Tourapis et al. | |
| 8,873,630 B2 | 10/2014 | Tourapis et al. | |
| 9,066,110 B2 | 6/2015 | Zhou | |
| 9,185,427 B2 | 11/2015 | Tourapis et al. | |
| RE45,983 E | 4/2016 | Deshpande | |
| 9,319,700 B2 | 4/2016 | Karczewicz | |
| 2003/0202605 A1 | 10/2003 | Hazra et al. | |
| 2004/0001546 A1 | 1/2004 | Tourapis et al. | |
| 2004/0008786 A1 | 1/2004 | Boyce | |
| 2004/0028134 A1 | 2/2004 | Subramaniyan et al. | |
| 2004/0047418 A1 | 3/2004 | Tourapis et al. | |
| 2004/0052507 A1 | 3/2004 | Kondo et al. | |
| 2004/0086044 A1 | 5/2004 | Kondo et al. | |
| 2004/0136461 A1 | 7/2004 | Kondo et al. | |
| 2004/0146109 A1 | 7/2004 | Kondo et al. | |
| 2004/0179620 A1 | 9/2004 | Foo et al. | |
| 2004/0190606 A1 | 9/2004 | Deshpande | |
| 2004/0223551 A1 | 11/2004 | Hannuksela | |
| 2004/0234143 A1 | 11/2004 | Hagai et al. | |
| 2004/0264566 A1 | 12/2004 | Kato et al. | |
| 2005/0013497 A1 | 1/2005 | Hsu et al. | |
| 2005/0025244 A1 | 2/2005 | Lee et al. | |
| 2005/0062885 A1 | 3/2005 | Kadono et al. | |
| 2005/0078683 A1 | 4/2005 | Page | |
| 2005/0141612 A1* | 6/2005 | Abe .................... | H04N 19/176 375/240.16 |
| 2005/0152452 A1 | 7/2005 | Suzuki | |
| 2005/0152682 A1 | 7/2005 | Kang et al. | |
| 2005/0185928 A1 | 8/2005 | Kang et al. | |
| 2005/0213828 A1 | 9/2005 | Thoreau et al. | |
| 2005/0243927 A1 | 11/2005 | Hubrich et al. | |
| 2005/0243928 A1 | 11/2005 | Hubrich et al. | |
| 2006/0023788 A1 | 2/2006 | Otsuka et al. | |
| 2006/0023790 A1 | 2/2006 | Tsai et al. | |
| 2006/0050778 A1 | 3/2006 | Aridome et al. | |
| 2006/0088094 A1 | 4/2006 | Cieplinski et al. | |
| 2006/0088286 A1 | 4/2006 | Shibata et al. | |
| 2006/0165175 A1 | 7/2006 | Yin | |
| 2006/0182436 A1 | 8/2006 | Tabuchi et al. | |
| 2006/0204228 A1 | 9/2006 | Kang et al. | |
| 2006/0209963 A1 | 9/2006 | Valente | |
| 2006/0215999 A1 | 9/2006 | Kang et al. | |
| 2006/0216000 A1 | 9/2006 | Kang et al. | |
| 2006/0233530 A1 | 10/2006 | Kang et al. | |
| 2006/0239358 A1 | 10/2006 | Soh et al. | |
| 2006/0269153 A1 | 11/2006 | Shi et al. | |
| 2006/0280253 A1 | 12/2006 | Tourapis et al. | |
| 2006/0291556 A1 | 12/2006 | Watanabe et al. | |
| 2007/0014358 A1 | 1/2007 | Tourapis et al. | |
| 2007/0014360 A1 | 1/2007 | Botzko et al. | |
| 2007/0025621 A1 | 2/2007 | Lee et al. | |
| 2007/0030899 A1 | 2/2007 | Iguchi et al. | |
| 2007/0041452 A1 | 2/2007 | Kondo et al. | |
| 2007/0110156 A1 | 5/2007 | Ji et al. | |
| 2007/0154103 A1 | 7/2007 | Au et al. | |
| 2007/0183499 A1 | 8/2007 | Kimata et al. | |
| 2007/0200949 A1 | 8/2007 | Walker et al. | |
| 2008/0063060 A1 | 3/2008 | Kondo et al. | |
| 2008/0063061 A1 | 3/2008 | Kondo et al. | |
| 2008/0063075 A1* | 3/2008 | Kondo ................. | H04N 19/105 375/240.16 |
| 2008/0069231 A1 | 3/2008 | Kondo et al. | |
| 2008/0069232 A1 | 3/2008 | Kondo et al. | |
| 2008/0084927 A1 | 4/2008 | Rosenzweig et al. | |
| 2008/0089420 A1 | 4/2008 | Karczewicz | |
| 2008/0089422 A1 | 4/2008 | Karczewicz | |
| 2008/0089423 A1 | 4/2008 | Karczewicz | |
| 2008/0089424 A1 | 4/2008 | Karczewicz et al. | |
| 2008/0117978 A1 | 5/2008 | Kapasi et al. | |

(56) References Cited

U.S. PATENT DOCUMENTS

| | | |
|---|---|---|
| 2008/0175491 A1 | 7/2008 | Kondo |
| 2008/0219350 A1 | 9/2008 | Guo et al. |
| 2008/0240245 A1 | 10/2008 | Lee et al. |
| 2009/0074069 A1 | 3/2009 | Jeon |
| 2009/0147855 A1 | 6/2009 | Song et al. |
| 2009/0304084 A1 | 12/2009 | Hallapuro |
| 2010/0086053 A1 | 4/2010 | Okada et al. |
| 2010/0118939 A1 | 5/2010 | Shimizu et al. |
| 2010/0124273 A1 | 5/2010 | Divorra Escoda et al. |
| 2010/0135387 A1 | 6/2010 | Divorra Escoda et al. |
| 2010/0177824 A1 | 7/2010 | Koo et al. |
| 2010/0284465 A1 | 11/2010 | Benzler et al. |
| 2011/0038420 A1 | 2/2011 | Lee et al. |
| 2011/0080954 A1 | 4/2011 | Bossen et al. |
| 2011/0090969 A1 | 4/2011 | Sung et al. |
| 2011/0113451 A1 | 5/2011 | Kang et al. |
| 2011/0176612 A1 | 7/2011 | Tsai et al. |
| 2011/0194608 A1 | 8/2011 | Rusert et al. |
| 2011/0194609 A1 | 8/2011 | Rusert et al. |
| 2011/0206123 A1 | 8/2011 | Panchal et al. |
| 2011/0261882 A1 | 10/2011 | Zheng et al. |
| 2011/0286527 A1 | 11/2011 | Kadono et al. |
| 2012/0008688 A1 | 1/2012 | Tsai et al. |
| 2012/0106645 A1 | 5/2012 | Lin et al. |
| 2012/0128060 A1 | 5/2012 | Lin et al. |
| 2012/0128071 A1 | 5/2012 | Celetto et al. |
| 2012/0128072 A1 | 5/2012 | Kobayashi et al. |
| 2012/0134415 A1 | 5/2012 | Lin et al. |
| 2012/0163466 A1 | 6/2012 | Sugio et al. |
| 2012/0195368 A1 | 8/2012 | Chien et al. |
| 2012/0207221 A1 | 8/2012 | Aono et al. |
| 2012/0230408 A1 | 9/2012 | Zhou |
| 2012/0236942 A1 | 9/2012 | Lin et al. |
| 2012/0243609 A1 | 9/2012 | Zheng et al. |
| 2012/0257678 A1* | 10/2012 | Zhou ............... H04N 19/52 375/240.16 |
| 2012/0263235 A1 | 10/2012 | Sugio et al. |
| 2012/0275522 A1 | 11/2012 | Kim et al. |
| 2012/0281763 A1 | 11/2012 | Suzuki |
| 2012/0300846 A1 | 11/2012 | Sugio et al. |
| 2012/0307902 A1 | 12/2012 | Sugio et al. |
| 2012/0307903 A1 | 12/2012 | Sugio et al. |
| 2012/0307905 A1 | 12/2012 | Kim et al. |
| 2012/0320969 A1 | 12/2012 | Zheng et al. |
| 2012/0320984 A1 | 12/2012 | Zhou |
| 2012/0328021 A1 | 12/2012 | Sugio et al. |
| 2013/0003843 A1 | 1/2013 | Guo et al. |
| 2013/0010869 A1 | 1/2013 | Sugio et al. |
| 2013/0023801 A1 | 1/2013 | Wang et al. |
| 2013/0034161 A1 | 2/2013 | Sugio et al. |
| 2013/0101038 A1 | 4/2013 | Shimizu et al. |
| 2013/0107959 A1 | 5/2013 | Park et al. |
| 2013/0148737 A1 | 6/2013 | Tourapis et al. |
| 2013/0156335 A1 | 6/2013 | Lim et al. |
| 2013/0208798 A1 | 8/2013 | Tourapis et al. |
| 2013/0272404 A1 | 10/2013 | Park et al. |
| 2014/0037003 A1 | 2/2014 | Kadono et al. |
| 2014/0037009 A1 | 2/2014 | Kadono et al. |
| 2014/0105302 A1 | 4/2014 | Takehara et al. |
| 2014/0140408 A1 | 5/2014 | Lee et al. |
| 2014/0241434 A1 | 8/2014 | Lin et al. |
| 2014/0301472 A1 | 10/2014 | Kadono et al. |
| 2015/0016527 A1 | 1/2015 | Tourapis et al. |
| 2015/0131725 A1 | 5/2015 | Sugio et al. |
| 2015/0288968 A1 | 10/2015 | Kadono et al. |
| 2015/0312585 A1 | 10/2015 | Kadono et al. |
| 2015/0382013 A1 | 12/2015 | Lim et al. |
| 2016/0088311 A1 | 3/2016 | Kadono et al. |
| 2016/0094857 A1 | 3/2016 | Kadono et al. |
| 2016/0094858 A1 | 3/2016 | Kadono et al. |
| 2016/0134890 A1 | 5/2016 | Tourapis et al. |
| 2016/0269741 A1 | 9/2016 | Kim et al. |
| 2017/0019681 A1 | 1/2017 | Park et al. |
| 2017/0105021 A1 | 4/2017 | Lim et al. |
| 2019/0007697 A1 | 1/2019 | Lim et al. |

FOREIGN PATENT DOCUMENTS

| | | |
|---|---|---|
| CN | 1578469 | 2/2005 |
| CN | 1833259 | 9/2006 |
| CN | 101090491 | 12/2007 |
| CN | 101198064 | 6/2008 |
| CN | 101379816 | 3/2009 |
| CN | 101600114 | 12/2009 |
| CN | 101860754 | 10/2010 |
| CN | 102439978 | 5/2012 |
| EP | 0 314 018 | 5/1989 |
| EP | 1 414 245 | 4/2004 |
| EP | 1 521 477 | 4/2005 |
| EP | 1 906 676 | 4/2008 |
| EP | 1 980 112 | 10/2008 |
| EP | 2 250 816 | 9/2009 |
| EP | 2 448 266 | 5/2012 |
| EP | 2 717 573 | 4/2014 |
| JP | 8-251601 | 9/1996 |
| JP | 10-224800 | 8/1998 |
| JP | 2002-152750 | 5/2002 |
| JP | 2002-534014 | 10/2002 |
| JP | 2005-136979 | 5/2005 |
| JP | 2005-318576 | 11/2005 |
| JP | 2006-519517 | 8/2006 |
| JP | 2007-28617 | 2/2007 |
| JP | 2007-142637 | 6/2007 |
| JP | 2008-211697 | 9/2008 |
| JP | 2008-283490 | 11/2008 |
| JP | 2009-124748 | 6/2009 |
| JP | 2010-529811 | 8/2010 |
| JP | 2013-517853 | 5/2013 |
| JP | 2013-543286 | 11/2013 |
| JP | 2014-514814 | 6/2014 |
| KR | 10-2007-0120416 | 12/2007 |
| KR | 10-2008-0088040 | 10/2008 |
| KR | 10-2009-0058954 | 6/2009 |
| KR | 10-2011-0045908 | 5/2011 |
| RU | 2381630 | 10/2005 |
| RU | 2 310 231 | 11/2007 |
| RU | 2 387 093 | 4/2010 |
| RU | 2009 114 363 | 10/2010 |
| RU | 2 419 244 | 5/2011 |
| TW | 545058 | 8/2003 |
| TW | 1330976 | 6/2005 |
| TW | 200604847 | 2/2006 |
| TW | 1259726 | 8/2006 |
| TW | 1264227 | 10/2006 |
| TW | 200742443 | 11/2007 |
| TW | 1317107 | 11/2009 |
| TW | 1325281 | 5/2010 |
| TW | I328357 | 8/2010 |
| TW | I329843 | 9/2010 |
| TW | 1331877 | 10/2010 |
| TW | 1335183 | 12/2010 |
| WO | 2004/014060 | 2/2004 |
| WO | 2004/088988 | 10/2004 |
| WO | 2005/013201 | 2/2005 |
| WO | 2006/019093 | 2/2006 |
| WO | 2007/015126 | 2/2007 |
| WO | 2007/018626 | 2/2007 |
| WO | 2007/092215 | 8/2007 |
| WO | 2008/086197 | 7/2008 |
| WO | 2009/011501 | 1/2009 |
| WO | 2009/051419 | 4/2009 |
| WO | 2009/115901 | 9/2009 |
| WO | 2009/126260 | 10/2009 |
| WO | 2010/090629 | 8/2010 |
| WO | 2010/148919 | 12/2010 |
| WO | 2011/046008 | 4/2011 |
| WO | 2011/047994 | 4/2011 |
| WO | 2011/061880 | 5/2011 |
| WO | 2011/062392 | 5/2011 |
| WO | 2011/064673 | 6/2011 |
| WO | 2011/103482 | 8/2011 |
| WO | 2012/030193 | 3/2012 |
| WO | 2012/043882 | 4/2012 |

(56) References Cited

FOREIGN PATENT DOCUMENTS

| WO | 2012/128903 | 9/2012 |
|---|---|---|
| WO | 2012/173415 | 12/2012 |
| WO | 2013/001803 | 1/2013 |

OTHER PUBLICATIONS

JCT-VC, "WD3: Working Draft 3 of High-Efficiency Video Coding", JCTVC-E603, Mar. 2011.

International Search Report dated May 22, 2012 in International (PCT) Application No. PCT/JP2012/001351.

"WD2: Working Draft 2 of High-Efficiency Video Coding", Joint Collaborative Team on Video Coding (JCT-VC) of ITU-T SG16 WP3 and ISO/IEC JTC1/SC29/WG11, JCTVC-D503_r1, 4$^{th}$ Meeting: Daegu, KR, Jan. 2011, pp. i-viii, 9-10, 85-94.

J. Jung and G. Clare, "Temporal MV predictor modification for MV-Comp, Skip, Direct and Merge schemes", Joint Collaborative Team on Video Coding (JCT-VC) of ITU-T SG16 WP3 and ISO/IEC JTC1/SC29/WG11, JCTVC-D164, 4th Meeting: Daegu, KR, Jan. 2011, pp. 1-5.

Hideki Takehara et al., Bi-derivative merge candidate, Joint Collaborative Team on Video Coding (JCT-VC) of ITU-T SG16 WP3 and ISO/IEC JCT1/SC29/WG11, JCTVC-F372, 6th Meeting: Torino, IT, Jul. 2011, pp. 1-5.

Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, 5$^{th}$ Meeting, Geneva, CH, Mar. 2011.

Laroche et al., "Robust solution for the AMVP parsing issue", Joint Collaborative Team on Video Coding (JCT-VC) of ITU-T SG16 WP3 and ISO/IEC JTC1/SC29/WG11 5$^{th}$ Meeting: Geneva, CH, Mar. 16-23, 2011 [JCTVC-E219].

Zhou et al., "A study on HM2.0 bitstream parsing and error resiliency issue", Joint Collaborative Team on Video Coding (JCT-VC) of ITU-T SG16 WP3 and ISO/IEC JTC1/SC29/WG11 5$^{th}$ Meeting: Geneva, CH, Mar. 16-23, 2011 [JCTVC-E0118].

Jung et al., "Proposition for robust parsing with temporal predictor", Joint Collaborative Team on Video Coding (JCT-VC) of ITU-T SG16 WP3 and ISO/IEC JTC1/SC29/WG11 4$^{th}$ Meeting: Daegu, KR, Jan. 20-28, 2011 [JCTVC-D197].

International Search Report dated Aug. 21, 2012 in corresponding International Application No. PCT/JP2012/003316.

Li et al., "On merge candidate construction", Joint Collaborative Team on Video Coding (JCT-VC) of ITU-T SG16 WP3 and ISO/IEC JTC1/SC29/WG11 5$^{th}$ Meeting: Geneva, CH, Mar. 16-23, 2011, [JCTVC-E146_r3].

International Search Report dated Aug. 28, 2012 in International Application No. PCT/JP2012/003386.

International Search Report dated Aug. 28, 2012 in International Application No. PCT/JP2012/003416.

International Search Report dated Aug. 28, 2012 in International Application No. PCT/JP2012/003496.

International Search Report dated Aug. 28, 2012 in International Application No. PCT/JP2012/003493.

International Search Report dated Oct. 30, 2012 in International Application No. PCT/JP2012/004924.

Sugio et al., "Parsing Robustness for Merge/AMVP", Joint Collaborative Team on Video Coding (JCTVC) of ITU-T SG16 WP3 and ISO/IEC JTC1/SC29/WG11, 6$^{th}$ Meeting, Torino, IT, Jul. 14-22, 2011 [JCTVC-F470].

Chen, "MVP index parsing with fixed number of candidates", Joint Collaborative Team on Video Coding (JCT-VC) of ITU-T SG16 WP3 and ISO/IEC JTC1/SC29/WG11, 6$^{th}$ Meeting, Torino, IT, Jul. 14-22, 2011 [JCTVC-F402].

Zhou et al., "A study on HM3.0 parsing throughput issue", Joint Collaborative Team on Video Coding (JCT-VC) of ITU-T SG16 WP3 and ISO/IEC JTC1/SC29/WG11, 6$^{th}$ Meeting: Torino, IT, Jul. 14-22, 2011, [JCTVC-F068].

Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d2, Ver. 4, 6$^{th}$ Meeting: Torino, IT, Jul. 14-22, 2011.

International Search Report dated Jan. 8, 2013 in International Application No. PCT/JP2012/006110.

International Preliminary Report on Patentability dated Dec. 3, 2013 in International Application No. PCT/JP2012/004924.

Extended European Search Report dated Feb. 4, 2014 in European Application No. 12771702.3.

Steffen Kamp et al., "Multihypothesis Prediction using Decoder Side Motion Vector Derivation in Inter Frame Video Coding", Visual Communications and Image Processing, Jan. 20-22, 2009, San Jose, CA, XP030081712.

Byeong-Moon Jeon, "New syntax for Bi-directional mode in MH pictures", JVT-C121, Joint Video Team (JVT) of ISO/IEC MPEG & ITU-T VCEG (ISO/IEC JTC1/SC29/WG11 and ITU-T SG16 Q.6), 3rd Meeting, Fairfax, VA, USA, May 6-10, 2002, XP030005233.

Yoshinori Suzuki et al., "Extension of uni-prediction simplification in B slices", JCTVC-D421, Joint Collaborative Team on Video Coding (JCT-VC) of ITU-T SG16 WP3 and ISO/IEC JTC1/SC29/WG11, 4th Meeting, Daegu, Korea, Jan. 20-28, 2011, XP030047967.

Markus Flierl et al., "Generalized B Pictures and the Draft H.264/AVC Video-Compression Standard", IEEE Transactions on Circuits and Systems for Video Technology, vol. 13, No. 7, pp. 587-597, Jul. 1, 2003.

Hideaki Kimata et al., "Spatial Temporal Adaptive Direct Prediction for Bi-Directional Prediction Coding on H.264", Picture Coding Symposium, Apr. 23-25, 2003, XP030080000.

Athanasios Leontaris et al., "Weighted Prediction Methods for Improved Motion Compensation", 16th IEEE International Conference on Image Processing, Nov. 7, 2009, pp. 1029-1032, XP031628457.

International Preliminary Report on Patentability dated Feb. 18, 2014 in International (PCT) Application No. PCT/JP2012/006110.

Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d4, 6th Meeting: Torino, IT, Jul. 14-22, 2011.

Extended European Search Report dated Sep. 11, 2014 in European Application No. 12792164.1.

Thomas Wiegand et al., "WD1: Working Draft 1 of High-Efficiency Video Coding", Joint Collaborative Team on Video Coding (JCT-VC) of ITU-T SG16 WP3 and ISO/IEC JTC1/SC29/WG11, JCTVC-C403, 3rd Meeting: Guangzhou, CN, Oct. 7-15, 2010.

Thomas Wiegand et al., "WD2: Working Draft 2 of High-Efficiency Video Coding", Joint Collaborative Team on Video Coding (JCT-VC) of ITU-T SG16 WP3 and ISO/IEC JTC1/SC29/WG11, JCTVC-D503, 4th Meeting: Daegu, KR, Jan. 20-28, 2011, pp. 62-63.

Jaehyun Lim et al., "Extended merging scheme using motion-hypothesis inter prediction", Joint Collaborative Team on Video Coding (JCT-VC) of ITU-T SG16 WP3 and ISO/IEC JTC1/SC29/WG11, JCTVC-B023, 2nd Meeting: Geneva, CH, Jul. 21-28, 2010.

Jungyoup Yang et al., "Motion Vector coding with Optimal Predictor", MPEG Meeting, ISO/IEC JTC1/SC29/WG11, MPEG2009/M16209, Lausanne, CH, Jan. 29, 2009.

Toshiyasu Sugio et al., "Modified usage of predicted motion vectors in forward directional bi-predictive coding frame", Joint Collaborative Team on Video Coding (JCT-VC) of ITU-T SG16 WP3 and ISO/IEC JTC1/SC29/WG11, JCTVC-D274, 4th Meeting: Daegu, KR, Jan. 20-28, 2011.

Shijun Sun et al., "Predictive Motion Estimation with Global Motion Predictor", Visual Communications and Image Processing, SPIE vol. 5308, Jan. 20, 2004.

Benjamin Bross et al., "CE9: Motion Vector Coding Test Report by Fraunhofer HHI", Joint Collaborative Team on Video Coding (JCT-VC) of ITU-T SG16 WP3 and ISO/IEC JTC1/SC29/WG11, JCTVC-D314, 4th Meeting: Daegu, KR, Jan. 20-28, 2011.

Yi-Jen Chiu et al., "CE1 Subtest 1: A joint proposal of candidate-based decoder-side motion vector derivation", Joint Collaborative Team on Video Coding (JCT-VC) of ITU-T SG16 WP3 and ISO/IEC JTC1/SC29/WG11, JCTVC-D448, 4th Meeting: Daegu, KR, Jan. 20-28, 2011.

(56) References Cited

OTHER PUBLICATIONS

Edouard Francois et al., "Robust solution for the AMVP parsing issue", Joint Collaborative Team on Video Coding (JCT-VC) of ITU-T SG16 WP3 and ISO/IEC JTC1/SC29/WG11, JCTVC-E219, 5th Meeting: Geneva, CH, Mar. 16-23, 2011.
Toshiyasu Sugio et al., "Parsing Robustness for Merge/AMVP", Joint Collaborative Team on Video Coding (JCT-VC) of ITU-T SG16 WP3 and ISO/IEC JTC1/SC29/WG11, JCTVC-F470, 6th Meeting: Torino, IT, Jul. 14-22, 2011.
Jianle Chen et al., "MVP index parsing with fixed number of candidates", Joint Collaborative Team on Video Coding (JCT-VC) of ITU-T SG16 WP3 and ISO/IEC JTC1/SC29/WG11, JCTVC-F402, 6th Meeting: Torino, IT, Jul. 14-22, 2011.
Extended European Search Report dated Oct. 1, 2014 in European Application No. 12789922.7.
Extended European Search Report dated Oct. 2, 2014 in European Application No. 12793588.0.
Extended European Search Report dated Nov. 12, 2014 in European Application No. 12819464.4.
Extended European Search Report dated Nov. 17, 2014 in European Application No. 12793037.8 (corrected version).
Minhua Zhou et al., "A study on HM3.0 parsing throughput issue", Joint Collaborative Team on Video Coding (JCT-VC) of ITU-T SG16 WP3 and ISO/IEC JTC1/SC29/WG11, JCTVC-F068, $6^{th}$ Meeting: Torino, IT, Jul. 14-22, 2011.
Bin Li et al., "An investigation on robust parsing", Joint Collaborative Team on Video Coding (JCT-VC) of ITU-T SG16 WP3 and ISO/IEC JTC1/SC29/WG11, JCTVC-E148, $5^{th}$ Meeting: Geneva, CH, Mar. 16-23, 2011.
Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603, $5^{th}$ Meeting: Geneva, CH, Mar. 16-23, 2011.
Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603_d5, $5^{th}$ Meeting: Geneva, CH, Mar. 16-23, 2011.
Office Action and Search Report dated Feb. 29, 2016 in Chinese Application No. 201280013348.3, with partial English translation.
Office Action dated Oct. 14, 2015 in Russian Application No. 2013141795, with English translation.
Extended European Search Report dated Jan. 5, 2016 in European Application No. 12793067.5.
Guillaume Laroche et al., "Competition Based Prediction for Skip Mode Motion Vector Using Macroblock Classification for the H.264 JM KTA Software", Advanced Concepts for Intelligent Vision Systems, Lecture Notes in Computer Science, pp. 789-799, Springer Berlin Heidelberg, Aug. 28, 2007, XP19069087.
Office Action dated Jul. 11, 2016 in U.S. Appl. No. 15/140,949.
Notice of Allowance and Search Report dated May 6, 2016 in Taiwanese Patent Application No. 101109890, with English translation.
Extended European Search Report dated Apr. 15, 2016 in European Application No. 12804429.4.
Jung et al., "Proposition for robust parsing with temporal predictor," Joint Collaborative Team on Video Coding (JCT-VC) of ITU-T SG16 WP3 and ISO/IEC JTC1/SC29/WG11, $4^{th}$ Meeting: Daegu, KR, Jan. 20-28, 2011, JCTVC-D197, WG11 No. m18957, XP30008237.
Su et al., "On motion vector competition," Joint Collaborative Team on Video Coding (JCT-VC) of ITU-T SG16 WP3 and ISO/IEC JTC1/SC29/WG11, $3^{rd}$ Meeting: Guangzhou, CN, Oct. 7-15, 2010, JCTVC-C257, WG11 No. m18298, XP30007964.
Laroche et al., "RD Optimized Coding for Motion Vector Predictor Selection," IEEE Transactions on Circuits and Systems for Video Technology, vol. 18, No. 9, Sep. 2008.
Winken et al., "Description of video coding technology proposal by Fraunhofer HHI," Joint Collaborative Team on Video Coding (JCT-VC) of ITU-T SG16 WP3 and ISO/IEC JTC1/SC29/WG11, $1^{st}$ Meeting: Dresden, DE, Apr. 15-23, 2010, JCTVC-A116.

Decision on Grant dated Jun. 6, 2016 in Russian Patent Application No. 2013141795, with English translation.
Sugio et al., "Parsing Robustness for Merge/AMVP," 97 MPEG Meeting, 18-7-2011-22-7-2011, Torino, IT, (Motion Picture Expert Group or ISO/IEC JTC1/SC29/WG11, JCTVC-F470, Version 6, Jul. 22, 2011, XP002758863.
Extended European Search Report dated Jun. 27, 2016 in European Patent Application No. 12841970.2.
Li et al., "Constrained temporal motion vector prediction for error resilience," Joint Collaborative Team on Video Coding (JCT-VC) of ITU-T SG16 WP3 and ISO/IEC JTC1/SC29/WG11, $4^{th}$ Meeting: Daegu, KR, Jan. 20-28, 2011, JCTVC-D139.
Lin et al., "Syntax for AMVP Parsing Error Control," Joint Collaborative Team on Video Coding (JCT-VC) of ITU-T SG16 WP3 and ISO/IEC JTC1/SC29/WG11, $4^{th}$ Meeting: Daegu, KR, Jan. 20-28, 2011, JCTVC-D126.
Yunfei Zheng et al., "Extended Motion Vector Prediction for Bi predictive Mode", Joint Collaborative Team on Video Coding (JCT-VC) of ITU-T SG 16 WP3 and ISO/IEC JTC1/SC29/WG11, JCTVC-E343, WG11 No. m19871, 5th Meeting: Geneva, Mar. 16-23, 2011.
Toshiyasu Sugio et al., "Parsing Robustness for Merge/AMVP", Joint Collaborative Team on Video Coding (JCT-VC) of ITU-T SG16 WP3 and ISO/IEC JTC1/SC29/WG11, JCTVC-F470_r4, WG11 No. m20900, 6th Meeting: Torino, IT, Jul. 14-22, 2011.
Search and Examination Report dated Sep. 26, 2016 in Singapore Application No. 2013078837.
Office Action dated Jul. 29, 2016 in U.S. Appl. No. 14/725,180.
Office Action dated Oct. 19, 2016 in U.S. Appl. No. 13/536,309.
Office Action dated Oct. 26, 2016 in U.S. Appl. No. 15/140,962.
Office Action dated Oct. 6, 2016 in European Application No. 12792164.1.
Office Action dated Oct. 19, 2016 in European Application No. 12819464.4.
Office Action dated Nov. 16, 2016 in U.S. Appl. No. 15/228,009.
Office Action dated Nov. 18, 2016 in U.S. Appl. No. 15/140,921.
Office Action dated Oct. 19, 2016 in European Application No. 12789922.7.
Office Action dated Oct. 19, 2016 in European Application No. 12793588.0.
Office Action dated Oct. 19, 2016 in European Application No. 12793037.8.
Office Action dated Nov. 28, 2016 in U.S. Appl. No. 15/140,949.
Office Action dated Jan. 19, 2017 in U.S. Appl. No. 15/266,004.
Office Action dated Feb. 9, 2017 in U.S. Appl. No. 15/379,993.
Extended European Search Report dated Jan. 27, 2017 in European Patent Application No. 16193061.5.
Office Action dated Jun. 27, 2017 in European Application No. 12804429.4.
Office Action dated Aug. 30, 2017 in Malaysian Application No. PI 2013702134.
Benjamin Bross et al., "WD4: Working Draft 4 of High-Efficiency Video Coding", Joint Collaborative Team on Video Coding (JCT-VC) of Itu-T SG16 WP3 and ISO/IEC JTC1/SC29/WG11 6th Meeting: Torino, IT, Jul. 14-22, 2011, JCTVC-F803_d6.
Office Action dated Feb. 24, 2017 in U.S. Appl. No. 14/725,180.
Office Action dated Mar. 15, 2017 in U.S. Appl. No. 15/140,962.
Office Action dated Apr. 24, 2017 in U.S. Appl. No. 13/652,643.
Office Action dated May 5, 2017 in U.S. Appl. No. 15/434,094.
Office Action dated May 30, 2017 in U.S. Appl. No. 15/228,009.
Office Action dated Jun. 14, 2017 in U.S. Appl. No. 15/228,018.
Office Action dated Jun. 8, 2017 in European Application No. 12793067.5.
Office Action dated Jul. 26, 2017 in U.S. Appl. No. 15/140,949.
Toshiyasu Sugio et. al., "Parsing Robustness for Merge/AMVP", Joint collaborative Team on Video Coding (JCT-VC) of ITU-T SG16 WP3 and ISO/IEC JTC1/SC29/WG11, 6th Meeting: Torino, IT, Jul. 14-22, 2011, JCTVC-F470_r3.
Office Action dated Aug. 15, 2017 in U.S. Appl. No. 14/725,180.
Office Action dated Oct. 30, 2017 in U.S. Appl. No. 13/652,643.
Office Action dated Nov. 22, 2017 in U.S. Appl. No. 15/140,949.
Office Action dated Nov. 22, 2017 in U.S. Appl. No. 15/602,631.

(56) References Cited

OTHER PUBLICATIONS

Office Action dated Dec. 8, 2017 in Canadian Patent Application No. 2,830,036.
Office Action dated Jan. 26, 2018 in U.S. Appl. No. 15/729,006.
Office Action dated Jan. 26, 2018 in U.S. Appl. No. 15/629,101.
Office Action dated Feb. 5, 2018 in U.S. Appl. No. 14/725,180.
Office Action dated Feb. 8, 2018 in Canadian Application No. 2,834,191.
Office Action dated Feb. 14, 2018 in European Application No. 12793588.0.
Office Action dated Feb. 14, 2018 in European Application No. 12793037.8.
Office Action dated Feb. 20, 2018 in Canadian Application No. 2,834,123.
Office Action dated Feb. 20, 2018 in Canadian Application No. 2,834,125.
Office Action dated Feb. 20, 2018 in Canadian Application No. 2,834,190.
Office Action dated Mar. 16, 2018 in Canadian Application No. 2,836,063.
Summons to attend oral proceedings pursuant to Rule 115(1) EPC issued Mar. 5, 2018 in European Application No. 12819464.4.
Office Action dated Apr. 17, 2018 in U.S. Appl. No. 15/228,009.
Office Action dated May 7, 2018 in U.S. Appl. No. 15/602,631.
Office Action dated Apr. 30, 2018 in Canadian Application No. 2,843,560.
Office Action dated May 18, 2018 in U.S. Appl. No. 15/729,006.
Office Action dated May 18, 2018 in U.S. Appl. No. 15/629,101.
Yoshinori Suzuki et al., "Extension of uni-prediction simplification in B slices", Joint Collaborative Team on Video Coding (JCT-VC) of ITU-T SG16 WP3 and ISO/IEC JTC1/SC29/WG11 4th Meeting: Daegu, Korea, Jan. 20-28, 2011 Document: JCTVC-D421 WG11 No. m19400.
Office Action dated Jun. 15, 2018 in U.S. Appl. No. 14/725,180.
Office Action dated Jun. 20, 2018 in Canadian Patent Application No. 2850595.
Office Action issued for Indian Patent Application No. 8519/CHENP/2013 dated Oct. 25, 2018.
Office Action issued for Canadian Patent Application No. 2,834,123 dated Oct. 16, 2018.
Decision to refuse dated Oct. 26, 2018 in European Patent Application No. 12 819 464.4.
Office Action dated Aug. 9, 2018 in U.S. Appl. No. 15/228,009.
Office Action dated Aug. 29, 2018 in U.S. Appl. No. 13/652,643.
Notice of Allowance and Notice of Allowability dated Sep. 21, 2018 in U.S. Appl. No. 15/602,631.
Office Action dated Oct. 12, 2018 in U.S. Appl. No. 15/729,006.
Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d1, 6th Meeting: Torino, IT, Jul. 14-22, 2011.
Office Action issued for Indian Patent Application No. 8520/CHENP/2013 dated Nov. 29, 2018.
Office Action issued for Indian Patent Application No. 729/CHENP/2014 dated Dec. 24, 2018.
Office Action dated Jan. 30, 2019 in U.S. Appl. No. 15/729,006.
Office Action dated Jan. 23, 2019 in U.S. Appl. No. 14/725,180.
Office Action dated Jan. 25, 2019 in U.S. Appl. No. 13/652,643.
Office Action dated Mar. 11, 2019 in Canadian Patent Application No. 2,843,560.
Extended European Search Report issued for European Patent Application No. 19150217.8, dated Apr. 3, 2019.
Summons to attend oral proceedings issued May 24, 2017 in European Application No. 12789922.7.
Summons to attend oral proceedings for European Patent Application No. 12804429.4 dated Apr. 1, 2019.
Summons to attend oral proceedings for European Patent Application No. 12804429.4 dated Apr. 16, 2019.
Office Action dated Jun. 27, 2019 in U.S. Appl. No. 14/725,180.
Office Action dated Jun. 28, 2019 in Indian Patent Application No. 7358/CHENP/2013.
Office Action dated Jul. 11, 2019 in U.S. Appl. No. 16/008,533.
Office Action dated Jul. 12, 2019 in U.S. Appl. No. 15/729,006.
Office Action dated Jul. 29, 2019 in U.S. Appl. No. 16/224,059.
Office Action dated Jul. 30, 2019 in Indian Patent Application No. 2602/CHENP/2014.
Office Action dated Aug. 27, 2019 in Indian Patent Application No. 9134/CHENP/2013.
Office Action dated Sep. 23, 2019 in Indian Patent Application No. 8665/CHENP/2013.
Office Action dated Oct. 3, 2019 in U.S. Appl. No. 16/223,998.
Office Action dated Sep. 9, 2019 in European Application No. 12 793 037.8.
Office Action dated Nov. 7, 2019 in U.S. Appl. No. 16/217,590.

* cited by examiner

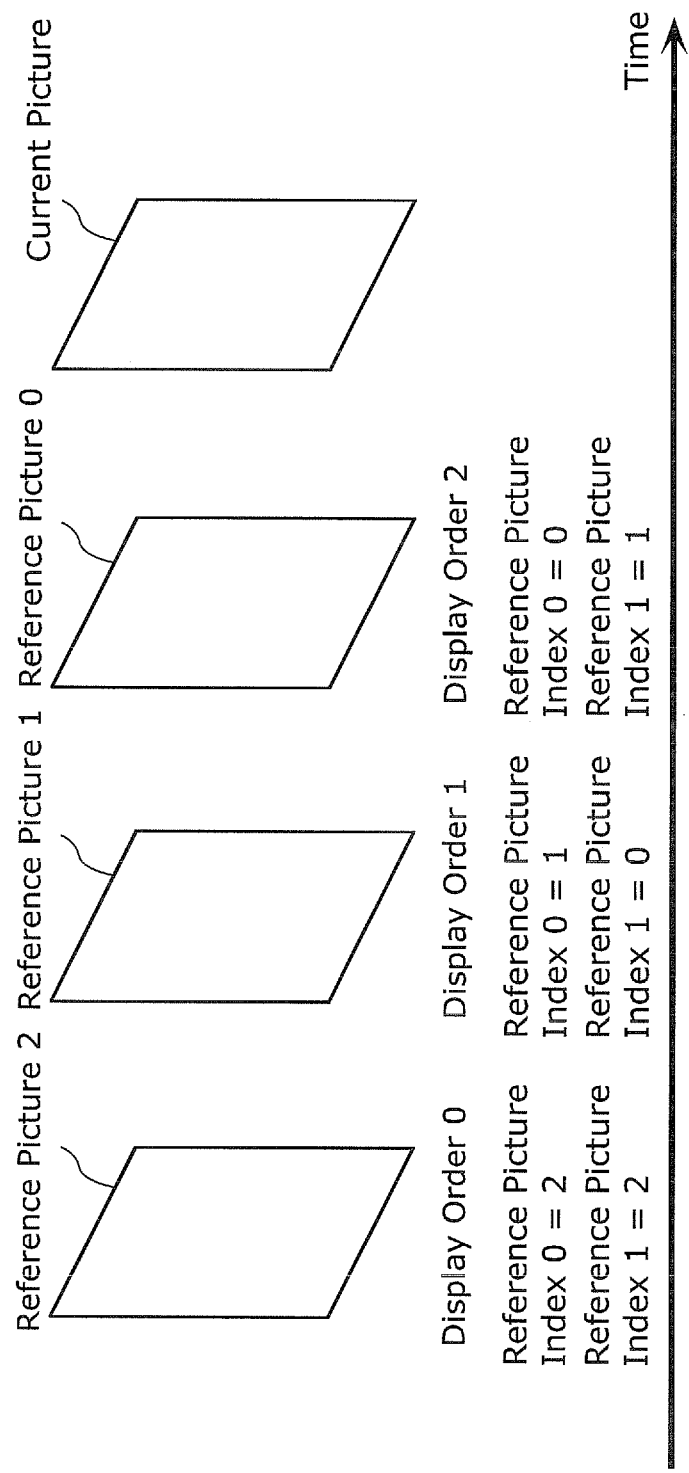

FIG. 1B

| Reference Picture List 0 | |
|---|---|
| Reference Picture Index 0 | Display Order |
| 0 | 2 |
| 1 | 1 |
| 2 | 0 |

FIG. 1C

| Reference Picture List 1 | |
|---|---|
| Reference Picture Index 1 | Display Order |
| 0 | 1 |
| 1 | 2 |
| 2 | 0 |

FIG. 3B

| Marge Block Index | Merge Block Candidate |
|---|---|
| 0 | Neighbor Block A (Prediction Direction 0, (MvL0_A, RefL0_A)) |
| 1 | Neighbor Block B (Prediction Direction 1, (MvL1_B, RefL1_B)) |
| 2 | Co-Located Merge Block (Bi-directional Prediction, (MvL0_Col, RefL0_Col), (MvL1_Col, RefL1_Col)) |
| 3 | not available (Because neighbor block C is intra-predicted) |
| 4 | Neighbor Block D (Prediction Direction 0, (MvL0_D, RefL0_D)) |

FIG. 6

| Marge Block Index | Merge Block Candidate |
|---|---|
| 0 | Neighbor Block A (Prediction Direction 0, (MvL0_A, RefL0_A)) |
| 1 | Neighbor Block B (Prediction Direction 1, (MvL1_B, RefL1_B)) |
| 2 | Co-Located Merge Block (Bi-directional Prediction, (MvL0_Col, RefL0_Col), (MvL1_Col, RefL1_Col)) |
| 3 | Combined Merge Block (Bi-directional Prediction, (MvL0_A, RefL0_A), (MvL1_B, RefL1_B)) |
| 4 | Neighbor Block D (Prediction Direction 0, (MvL0_D, RefL0_D)) |

FIG. 7

| Marge Block Index | Assigned Bit Sequence |
|---|---|
| 0 | 0 |
| 1 | 10 |
| 2 | 110 |
| 3 | 1110 |
| 4 | 1111 |

FIG. 18

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

Stream of TS packets

Data structure of PMT

FIG. 29
| Corresponding standard | Driving frequency |
|---|---|
| MPEG-4 AVC | 500 MHz |
| MPEG-2 | 350 MHz |
| ⋮ | ⋮ |
FIG. 30A
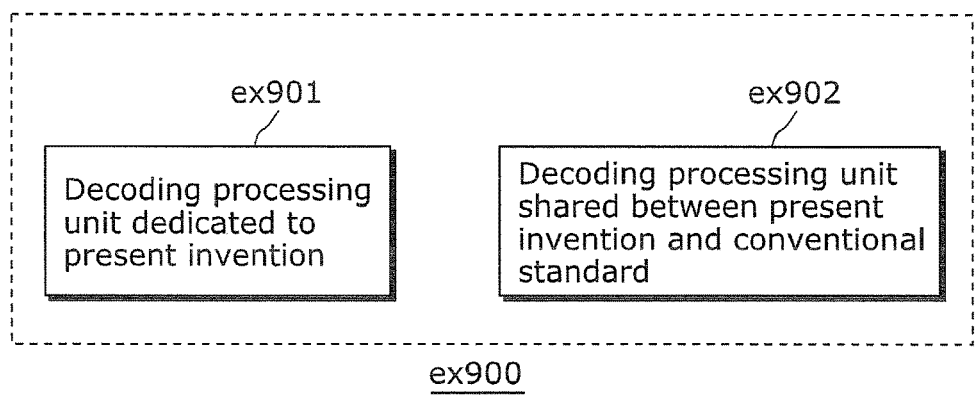
FIG. 30B
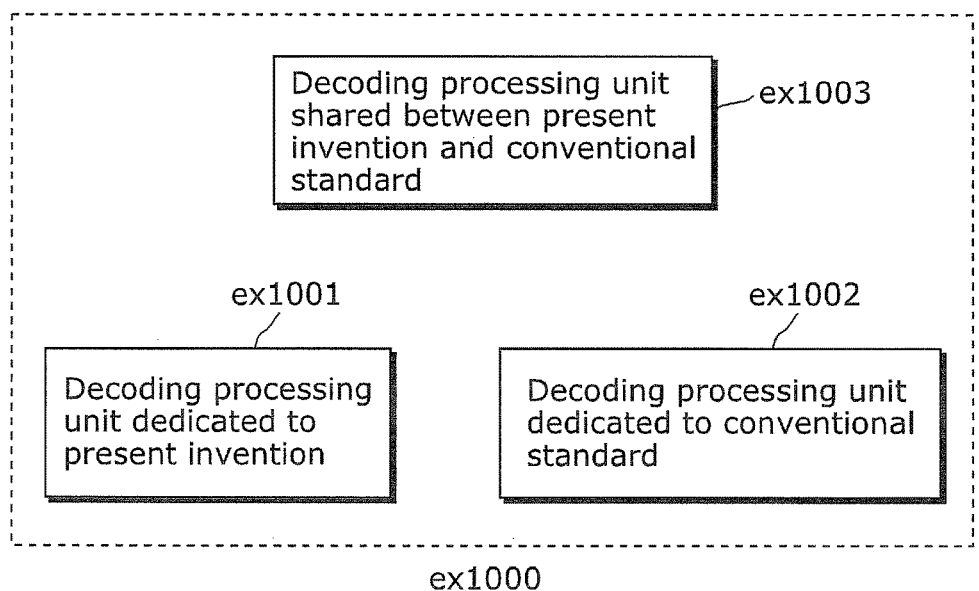

MOVING PICTURE CODING METHOD, MOVING PICTURE CODING APPARATUS, MOVING PICTURE DECODING METHOD, MOVING PICTURE DECODING APPARATUS AND MOVING PICTURE CODING AND DECODING APPARATUS

TECHNICAL FIELD

The present invention relates to moving picture coding methods of coding input image on a block-by-block basis using inter-picture prediction with reference to coded picture(s), and moving picture decoding methods of decoding a bitstream on a block-by-block basis using inter-picture prediction.

BACKGROUND ART

In moving picture coding, generally, an information amount is compressed by using a redundancy of a spatial direction and a temporal direction of moving pictures. Here, in general, one of the methods using a redundancy in a spatial direction is transformation to a frequency domain, and one of the methods using a redundancy in a temporal direction is inter-picture prediction (hereinafter, referred to as "inter prediction") coding. In the inter prediction coding, when a current picture is to be coded, a coded picture prior or subsequent to the current picture in display order is used as a reference picture. Then, motion estimation is performed on the current picture corresponding to the reference picture to estimate a motion vector. Then, a difference between prediction image data generated by motion compensation based on the estimated motion vector and image data of the current picture is obtained to remove a redundancy in a temporal direction. Here, in the motion estimation, a difference value between the current block in a current picture and a block in the reference picture is calculated, and a block having the smallest difference value in the reference picture is determined as a reference block. Then, by using the current block and the reference block, a motion vector is estimated.

In the moving picture coding scheme known as H.264 that has already been standardized, in order to compress an information amount, three picture types of I picture, P picture, and B picture are used. I picture is a picture on which inter prediction coding is not performed, in other words, on which intra-picture prediction (hereinafter, referred to as "intra prediction") coding is performed. P picture is a picture on which inter prediction coding is performed with reference to one coded picture located prior or subsequent to the current picture in display order. B picture is a picture on which inter prediction coding is performed with reference to two coded pictures located prior or subsequent to the current picture in display order.

In the inter prediction coding, a reference picture list for specifying a reference picture is generated. The reference picture list is a list in which a coded reference picture to be referred to in inter prediction is assigned with a corresponding value(s) of a reference picture index. For example, since a B picture can be coded with reference to two pictures, a B picture has two reference picture lists (L0, L1).

FIG. 1A is a diagram for explaining assignment of reference picture indexes for each of reference pictures. FIGS. 1B and 1C show an example of a pair of reference picture lists for a B picture. In FIG. 1A, for example, it is assumed that a reference picture 2, a reference picture 1, a reference picture 0, and a current picture to be coded are arranged in display order. Under the assumption, the reference picture list 0 (L0) is an example of a reference picture list in a prediction direction 0 (the first prediction direction) for bi-directional prediction. As shown in FIG. 1B, a value "0" of a reference picture index 0 is assigned to the reference picture 0 arranged in the display order 2, a value "1" of the reference picture index 0 is assigned to the reference picture 1 arranged in the display order 1, and a value "2" of the reference picture index 0 is assigned to the reference picture 2 arranged in the display order 0. In short, a greater value of the reference picture index is assigned to a picture temporally closer to the current picture in the display order. On the other hand, the reference picture list 1 (L1) is an example of a reference picture list in a prediction direction 1 (the second prediction direction) for bi-directional prediction. In the reference picture list 1 (L1), a value "0" of a reference picture index 1 is assigned to the reference picture 1 arranged in the display order 1, a value "1" of the reference picture index 1 is assigned to the reference picture 0 arranged in the display order 2, and a value "2" of the reference picture index 1 is assigned to the reference picture 2 arranged in the display order 0. As described above, for each of reference pictures, it is possible to assign different reference picture indexes to respective prediction directions (the reference pictures 0 and 1 in FIG. 1A), or assign the same reference picture index to both prediction directions (reference picture 2 in FIG. 1A).

Furthermore, in the moving picture coding method scheme known as H.264 (see Non-Patent Literature 1), as an inter prediction coding mode for each current block in a B picture, there is a motion vector estimation mode of coding (a) a difference value between prediction image data and image data of a current block and (b) a motion vector used in generating the prediction image data. At the motion vector estimation mode, either bi-directional prediction or one-directional prediction is selected. In the bi-directional prediction, a prediction image is generated with reference to two coded pictures located prior or subsequent to the current picture. On the other hand, in the one-directional prediction, a prediction image is generated with reference to one coded picture located prior or subsequent to the current picture.

Moreover, in the moving picture coding scheme known as H.264, in coding of a B picture, when motion vectors are to be derived, it is possible to select a coding mode called a temporal prediction motion vector mode. The inter prediction coding method at the temporal prediction motion vector mode is described with reference to FIG. 2. FIG. 2 is an explanatory diagram showing motion vectors at the temporal prediction motion vector mode, and shows the situation where a block "a" in a picture B2 is coded at the temporal prediction motion vector mode. In this situation, a motion vector vb is used. The motion vector vb has been used to code a block "b" in a picture P3 that is a reference picture located subsequent to the picture B2. The block "b" (hereinafter, referred to as a "co-located block") is located, in the picture P3, at a position corresponding to the position of the block "a". The motion vector vb is a motion vector that has been used to code the block "b", and refers to a picture P1. By using a motion vector in parallel to the motion vector vb, the block "a" obtains reference blocks from the picture P1 that is a forward reference picture and from the picture P3 that is a backward reference picture. Thereby, bi-directional prediction is performed to code the block "a". More specifically, the motion vectors used to code the block "a" are a motion vector vat regarding the picture PI and a motion vector vat regarding the picture P3.

CITATION LIST

Patent Literature

NPL-1: ITU-T Recommendation H. 264, "Advanced video coding for generic audiovisual services", March 2010.

SUMMARY OF INVENTION

Technical Problem

However, conventionally, there is a situation where, in coding a current block, the selection of either bi-directional prediction or one-directional prediction causes decrease of coding efficiency.

One non-limiting and exemplary embodiment of the present disclosure provides a moving picture coding method and a moving picture decoding method which are capable of improving coding efficiency.

Solution to Problem

In one general aspect, the techniques disclosed here feature; a moving picture coding method of coding a current block, by copying at least one reference picture index value and at least one motion vector, the at least one reference picture index value being for specifying a reference picture that has been used in coding a block different from the current block, the moving picture coding method including: specifying a plurality of first candidate blocks from which the at least one reference picture index value and the at least one motion vector are to be copied; generating a second candidate block that uses bi-directional prediction, by combining reference picture index values and motion vectors which haven been used for at least part of the first candidate blocks; selecting, from the first candidate blocks and the second candidate block, a block from which the at least one reference picture index value and the at least one motion vector are to be copied to code the current block; and copying the at least one reference picture index value and the at least one motion vector from the selected block, and coding the current block using the copied at least one reference picture index value and the copied at least one motion vector.

Thereby, it is possible to code the current picture using motion vector(s) and reference picture(s) which are the most appropriate for the current block. As a result, coding efficiency can be improved.

For example, it is possible that the generating of the second candidate block includes: determining whether or not each of the first candidate blocks has one or more reference picture index value and one or more motion vector; and generating the second candidate block, when at least one of the first candidate blocks does not have any reference picture index value and any motion vector.

For example, it is possible that the moving picture coding method further includes: determining whether or not the current block is to be coded by using the at least one reference picture index value and the at least one motion vector which are copied from one of the first candidate blocks or the second candidate block; setting a flag indicating a result of the determining; and adding the flag to a bitstream including the current block.

For example, it is possible that the moving picture coding method further includes: specifying a block index value corresponding to the selected block from which the at least one reference picture index value and the at least one motion vector are to be copied to code the current block, from a candidate list in which the first candidate blocks and the second candidate block are assigned with respective block index values; and adding the specified block index value to a bitstream including the current block.

For example, it is possible that the generating of the second candidate block includes: determining whether or not two of the first candidate blocks have reference picture index values indicating different prediction directions and have been coded by bi-directional prediction; and generating the second candidate block, when the two of the first candidate blocks have different prediction directions or have been coded by bi-directional prediction.

For example, it is possible that the generating of the second candidate block further includes: determining whether or not one of the two of the first candidate blocks has been predicted in a first prediction direction or coded by bi-directional prediction, and the other one of the two of the first candidate blocks has been predicted in a second prediction direction or coded by bi-directional prediction; and when it is determined that the one of the two of the first candidate blocks has been predicted in the first prediction direction or coded by bi-directional prediction, and the other one of the two of the first candidate blocks has been predicted in the second prediction direction or coded by bi-directional prediction, generating the second candidate block by (i) selecting a reference picture index value and a motion vector which have been used in the first prediction direction for the one of the two of the first candidate blocks, as a reference picture index value and a motion vector which are used in the first prediction direction for the second candidate block, and (ii) selecting a reference picture index value and a motion vector which have been used in the second prediction direction for the other one of the two of the first candidate blocks, as a reference picture index value and a motion vector which are used in the second prediction direction for the second candidate block.

For example, it is possible that the generating of the second candidate block further includes: determining whether or not one of the two of the first candidate blocks has been predicted in a first prediction direction or coded by bi-directional prediction, and the other one of the two of the first candidate blocks has been predicted in a second prediction direction or coded by bi-directional prediction; and when it is NOT determined that the one of the two of the first candidate blocks has been predicted in the first prediction direction or coded by bi-directional prediction, and the other one of the two of the first candidate blocks has been predicted in the second prediction direction or coded by bi-directional prediction, generating the second candidate block by (i) selecting a reference picture index value and a motion vector which have been used in the first prediction direction for the other one of the two of the first candidate blocks, as a reference picture index value and a motion vector which are used in the first prediction direction for the second candidate block, and (ii) selecting a reference picture index value and a motion vector which have been used in the second prediction direction for the one of the two of the first candidate blocks, as a reference picture index value and a motion vector which are used in the second prediction direction for the second candidate block.

In another aspect, the techniques disclosed here feature; a moving picture decoding method of decoding a current block, by copying at least one reference picture index value and at least one motion vector, the at least one reference picture index value being for specifying a reference picture that has been used in decoding a block different from the current block, the moving picture decoding method including: specifying a plurality of first candidate blocks from which the at least one reference picture index value and the at least one motion vector are to be copied; generating a second candidate block that uses bi-directional prediction, by combining reference picture index values and motion vectors which haven been used for at least part of the first candidate blocks; selecting, from the first candidate blocks and the second candidate block, a block from which the at least one reference picture index value and the at least one motion vector are to be copied to decode the current block; and copying the at least one reference picture index value and the at least one motion vector from the selected block, and decoding the current block using the copied at least one reference picture index value and the copied at least one motion vector.

Thereby, it is possible to decode a coded bitstream using the most appropriate motion vector(s) and the most appropriate reference picture(s).

For example, it is possible that the generating of the second candidate block includes: determining whether or not each of the first candidate blocks has a reference picture index value and a motion vector; and generating the second candidate block, when at least one of the first candidate blocks does not have any reference picture index value and any motion vector.

For example, it is possible that the moving picture decoding method further includes: obtaining, from a bitstream including the current block, a flag indicating whether or not the current block is to be decoded by using the at least one reference picture index value and the at least one motion vector which are copied from one of the first candidate block or the second candidate block; and decoding the current block according to the flag.

For example, it is possible that the moving picture decoding method further includes: obtaining a block index value from a bitstream including the current block; and selecting, by using the obtained block index value, a block from which the at least one reference picture index value and the at least one motion vector are to be copied to decode the current block, from a candidate list in which the first candidate blocks and the second candidate block are assigned with respective block index values.

For example, it is possible that the generating of the second candidate block includes: determining whether or not two of the first candidate blocks have reference picture index values indicating different prediction directions and have been coded by bi-directional prediction; and generating the second candidate block, when the two of the first candidate blocks have different prediction directions or have been coded by bi-directional prediction.

For example, it is possible that the generating of the second candidate block further includes: determining whether or not one of the two of the first candidate blocks has been predicted in a first prediction direction or coded by bi-directional prediction, and the other of the two of the first candidate blocks has been predicted in a second prediction direction or coded by bi-directional prediction; and when it is determined that the one of the two of the first candidate blocks has been predicted in the first prediction direction or coded by bi-directional prediction, and the other of the two of the first candidate blocks has been predicted in the second prediction direction or coded by bi-directional prediction, generating the second candidate block by (i) selecting a reference picture index value and a motion vector which have been used in the first prediction direction for the one of the two of the first candidate blocks, as a reference picture index value and a motion vector which are used in the first prediction direction for the second candidate block, and (ii) selecting a reference picture index value and a motion vector which have been used in the second prediction direction for the other one of the two of the first candidate blocks, as a reference picture index value and a motion vector which are used in the second prediction direction for the second candidate block.

It should be noted that the present disclosure can be implemented not only as the above moving picture coding method and moving picture decoding method, but also as: a moving picture coding apparatus, a moving picture decoding apparatus, and a moving picture coding and decoding apparatus each of which includes processing units performing the characterized steps included in the moving picture coding method and moving picture decoding method; a program causing a computer to execute the steps; and the like. The present disclosure can be implemented also as: a computer-readable recording medium, such as a Compact Disc-Read Only Memory (CD-ROM), on which the above program is recorded; information, data, signals indicating the program; and the like. The program, information, data, or signals can be distributed via a transmission medium such as the Internet.

Advantageous Effects of Invention

According to the present disclosure, a new merge block candidate of bi-directional prediction is calculated from merge block candidates, so as to improve coding efficiency.

BRIEF DESCRIPTION OF DRAWINGS

These and other objects, advantages and features of the invention will become apparent from the following description thereof taken in conjunction with the accompanying drawings that illustrate a specific embodiment of the present invention. In the Drawings:

FIG. 1A is a diagram for explaining assignment of reference picture indexes for each of reference pictures;

FIG. 1B is a table showing an example of one of reference picture lists for a B picture;

FIG. 1C is a table showing an example of the other reference picture list for a B picture;

FIG. 3B is a table showing an example of a merge block candidate list in which each value of a merge index is assigned to a motion vector and a reference picture index which are to be used at the merge mode;

FIG. 6 is a table showing an example of a merge block candidate list in which each value of a merge index is assigned to a motion vector and a reference picture index which are to be used at the merge mode according to Embodiment 1;

FIG. 7 is an example of a coding table which is used to perform variable length coding on the merge block index;

FIG. 18 illustrates a structure of multiplexed data;

FIG. 29 shows an example of a look-up table in which video data standards are associated with driving frequencies;

FIG. 30A is a diagram showing an example of a configuration for sharing a module of a signal processing unit; and FIG. 30B is a diagram showing another example of a configuration for sharing a module of the signal processing unit.

DESCRIPTION OF EMBODIMENTS

In the moving picture coding scheme, a coding mode called a merge mode has been examined as an inter prediction mode for each block to be coded in a B picture or a P picture. At this merge mode, a motion vector and a value of a reference picture index (hereinafter, referred to also as "reference picture index values") are copied from a neighbor block of a current block to be coded, so as to code the current block. Here, by adding the index value and the like of the neighbor block from which they are copied are added into a bitstream. As a result, a motion vector or a value of reference picture index which have been used in coding can be selected in decoding. A detailed example is described with reference to corresponding figures.

Figure 2:
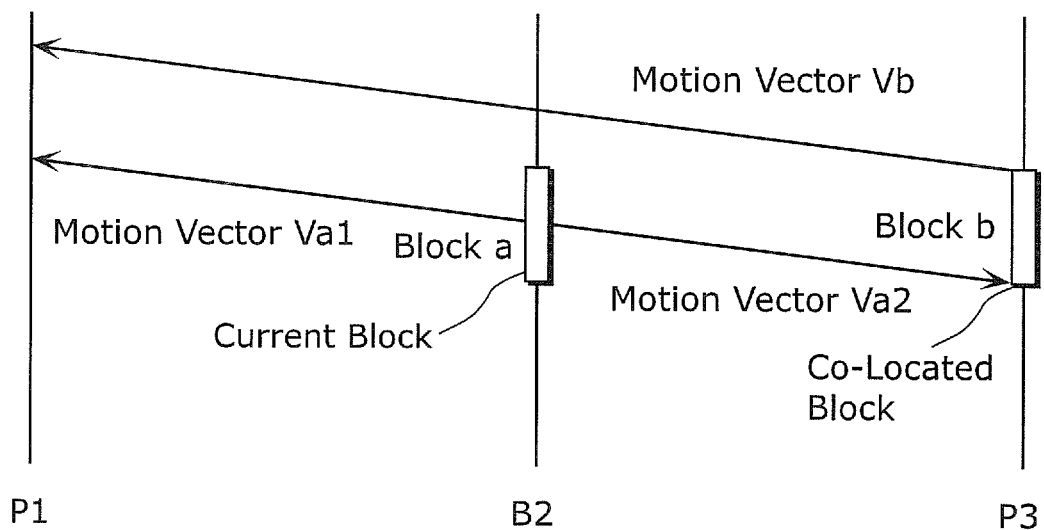
FIG. 2 is an exemplary diagram showing motion vectors at the temporal prediction motion vector mode.
Figure 3A:
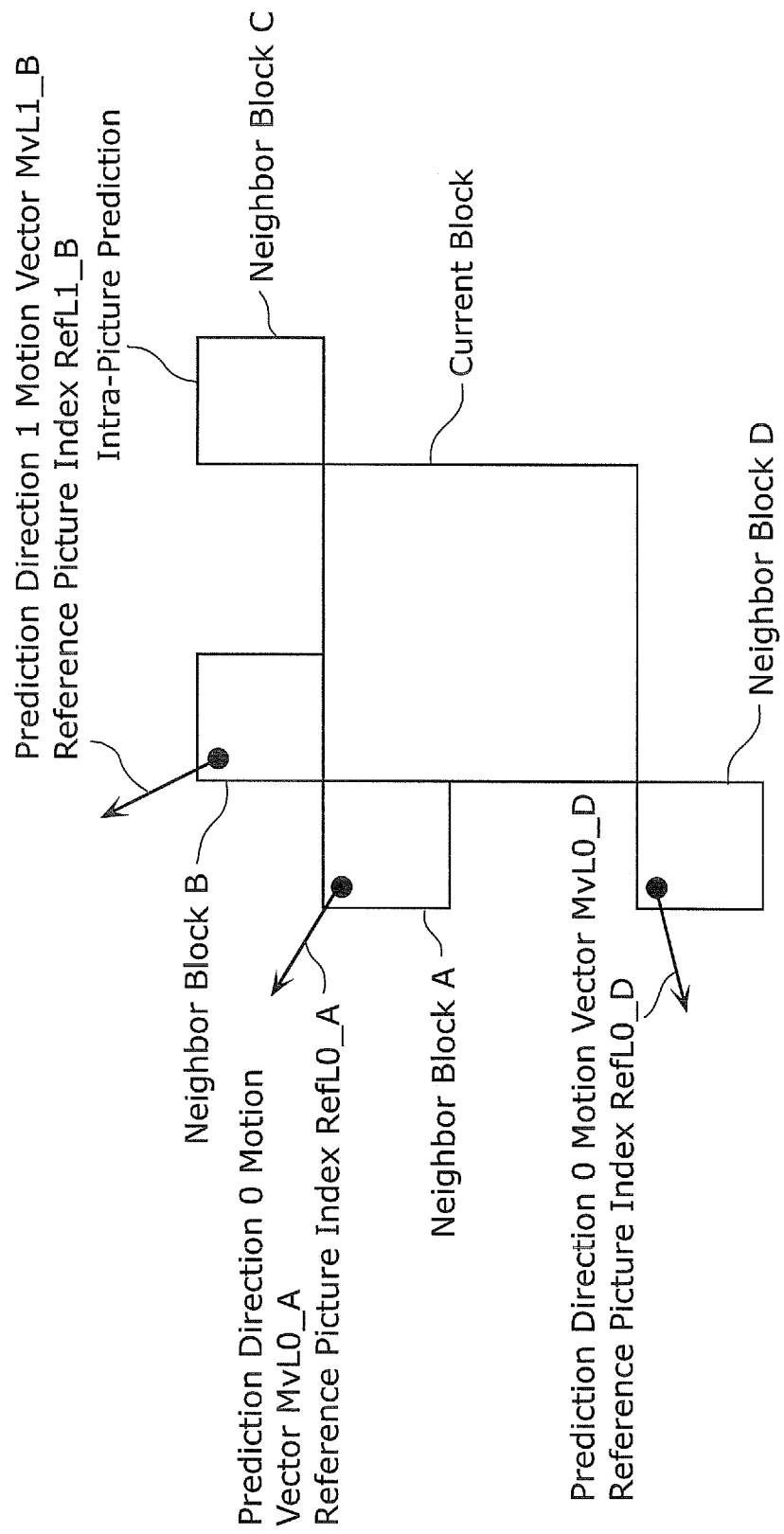
FIG. 3A is a diagram showing a relationship among: a current block to be coded; neighbor blocks; and motion vectors of the neighbor blocks.

FIG. 3A is a diagram showing a relationship among: a current block to be coded; neighbor blocks; and motion vectors of the neighbor blocks. FIG. 3B is a table showing an example of a merge block candidate list in which each value of a merge index is assigned to a motion vector and a reference picture index which are to be used at the merge mode.

In FIG. 3A, a coded block at the immediately left of the current block is referred to as a neighbor block A, a coded block immediately above the current block is referred to as a neighbor block B, a coded block at the immediately upper right of the current block is referred to as a neighbor block C, and a coded block at the immediately lower left of the current block is referred to as a neighbor block D. Furthermore, in FIG. 3A, the neighbor block A has been coded by one-directional prediction using a prediction direction 0 (the first prediction direction). The neighbor block A has a motion vector MvL0_A of the prediction direction 0 for a reference picture indicated by an index value RefL0_A in a reference picture index of the prediction direction 0. Here, the motion vector MvL0 is a motion vector referring to a reference picture specified by the reference picture list 0 (L0), and MvL1 is a motion vector referring to a reference picture specified by the reference picture list 1 (L1). The neighbor block B has been coded by one-directional prediction using a prediction direction 1 (the second prediction direction). The neighbor block B has a motion vector MvL1_B of the prediction direction 1 for a reference picture indicated by an index value RefL1_B in a reference picture index of the prediction direction 1. The neighbor block C has been coded by intra prediction. The neighbor block D has been coded by one-directional prediction using the prediction direction 0. The neighbor block D has a motion vector MvL0_D of the prediction direction 0 for a reference picture indicated by an index value RefL0_D in the reference picture index of the prediction direction 0.

In the situation as shown in FIG. 3A, as a motion vector and a reference picture index value for the current block, a motion vector and a reference picture index value which offer the highest coding efficiency are selected, for example, from (a) the motion vectors and the reference picture index values of the neighbor blocks A, B, C, and D, and (b) a motion vector and a reference picture index value of the co-located block which are obtained at the temporal prediction motion vector mode. Then, a merge block index indicating the selected neighbor block or co-located block is added into the bitstream. For example, if the neighbor block A is selected, the current block is coded by using the motion vector MvL0_A and the reference picture index value ReL0_A of the prediction direction 0, and only a value "0" of the merge block index indicating that the neighbor block A is used as shown in FIG. 3B is added into the bitstream, so that an information amount of motion vectors and reference picture index values can be reduced.

However, at the above-described merge mode, if a block to be a merge block candidate does not have any motion vector and reference picture index value because the block has been coded by intra prediction (like the neighbor block C), the block cannot be used as a merge block candidate. In the above situation, it is also considered that the number of available merge block candidates is decreased, the selection range for a motion vector and a reference picture index value which offer the highest coding efficiency is reduced, and eventually coding efficiency is decreased.

In order to address the above problem, one non-limiting and exemplary embodiment provides an image coding method and an image decoding method which are capable of improving coding efficiency without decreasing the number of available merge block candidates at the merge mode.

The following describes embodiments according to the present disclosure with reference to the drawings. It should be noted that all the embodiments described below are specific examples of the present disclosure. Numerical values, shapes, materials, constituent elements, arrangement positions and the connection configuration of the constituent elements, steps, the order of the steps, and the like described in the following embodiments are merely examples, and are not intended to limit the present disclosure. The present disclosure is characterized only by the appended claims. Therefore, among the constituent elements in the following embodiments, constituent elements that are not described in independent claims that show the most generic concept of the present disclosure are described as elements constituting more desirable configurations, although such constituent elements are not necessarily required to achieve the object of the present disclosure.

Embodiment 1

Figure 4:
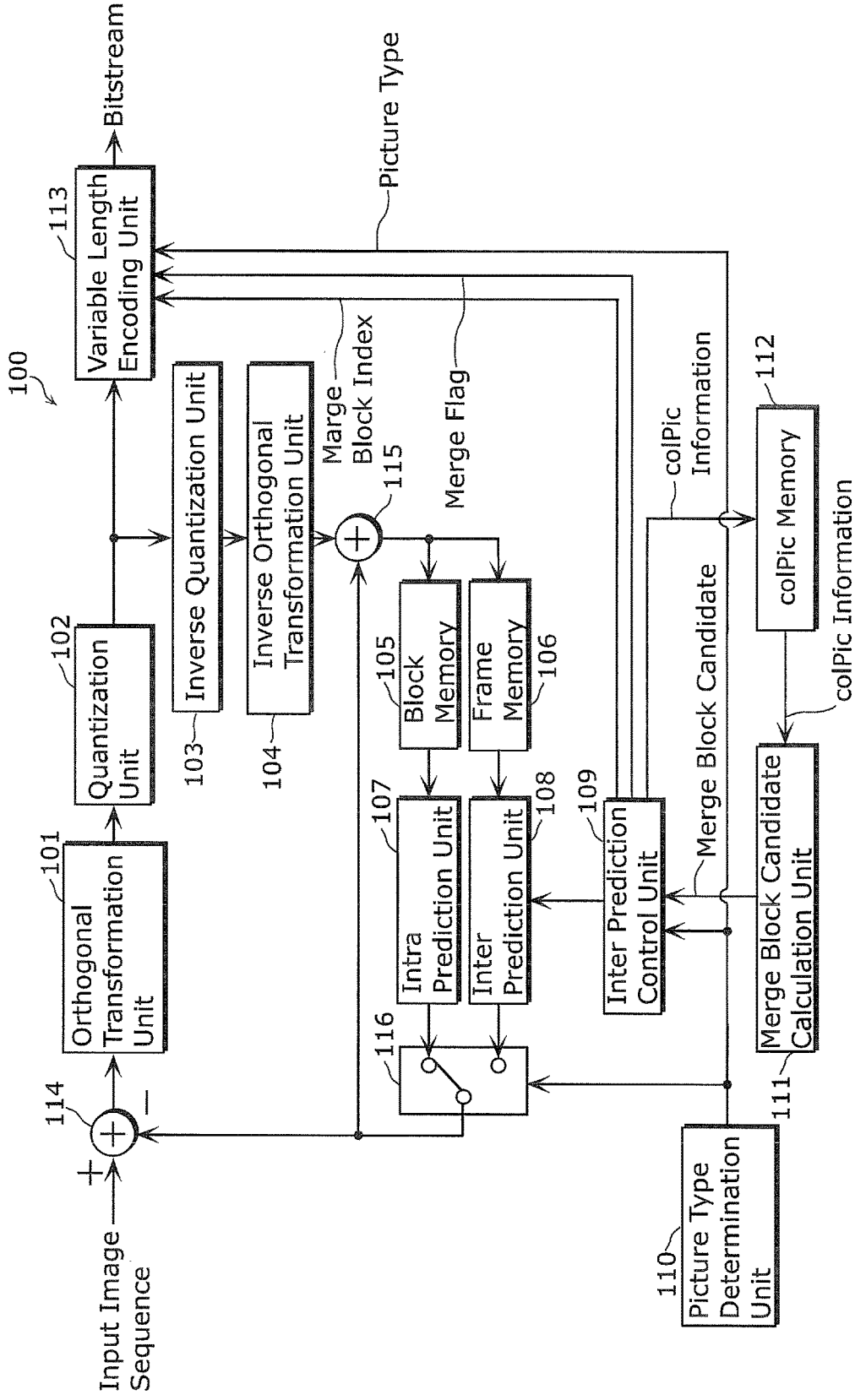
FIG. 4 is a block diagram showing a structure of a moving picture coding apparatus using a moving picture coding method according to an embodiment of the present disclosure.

FIG. 4 is a block diagram showing a structure of a moving picture coding apparatus using a moving picture coding method according to Embodiment 1.

As shown in FIG. 4, the moving picture coding apparatus 100 includes an orthogonal transformation unit 101, a quantization unit 102, an inverse quantization unit 103, an inverse orthogonal transformation unit 104, a block memory 105, a frame memory 106, an intra prediction unit 107, an inter prediction unit 108, an inter prediction control unit 109, a picture type determination unit 110, a merge block candidate calculation unit 111, a colPic memory 112, a variable length coding unit 113, a subtractor 114, an adder 115, and a switch unit 116.

The orthogonal transformation unit 101 transforms prediction error data that is a difference between prediction data generated as described below and an input image sequence, from an image domain to a frequency domain. The quantization unit 102 quantizes the prediction error data that has been transformed in the frequency domain. The inverse quantization unit 103 inversely quantizes the prediction error data that has been quantized by the quantization unit 102. The inverse orthogonal transformation unit 104 transforms the inversely-quantized prediction error data from a frequency domain to an image domain. The adder 115 adds the prediction data to the inversely-quantized prediction error data to generate a decoded data. The block memory 105 holds the decoded image on a block-by-block basis. The frame memory 106 holds the decoded image on a picture-by-picture basis. The picture type determination unit 110 determines by which picture type from among an I picture, a B picture, or a P picture, each picture in the input image sequence is to be coded, and generates picture type information. The intra prediction unit 107 codes a current block to be coded by intra prediction, by using the decoded image stored on a block-by-block basis in the block memory 105, so as to generate prediction picture. The inter prediction unit 108 codes the current block by inter prediction by using the decoded image stored on a picture-by-picture basis in the frame memory 106 and a motion vector derived in motion estimation, so as to generate prediction picture. The subtractor 114 subtracts the prediction data generated by the intra prediction unit 206 or the inter prediction unit 207 from the input image sequence, so as to calculate prediction error data.

The merge block candidate calculation unit 111 specifies merge block candidates (the first candidate blocks) of the merge mode, by using (a) motion vectors and reference picture index values which have been used to code the neighbor blocks and (b) colPic information such as a motion vector and the like of the co-located block which is stored in the colPic memory 112 regarding the current block. Here, the merge block candidates are candidates of a block from which at least one motion vector and at least one reference picture index value are directly used (copied) for the current block. In addition, the merge block candidate calculation unit 111 generates a combined merge block (the second candidate block) by the method described below. It should be noted that the combined merge block is not a block actually having pixel values, but a virtual block having motion vectors and reference picture index values. Furthermore, the merge block candidate calculation unit 111 assigns each of the specified merge blocks with a corresponding value of the merge block index (block index). Then, the merge block candidate calculation unit 111 provides the merge block candidates and the values of the merge block index (hereinafter, referred to also as "merge block index values") to the inter prediction control unit 109. It should be noted in the present embodiment 1 that the motion vectors and the reference picture index values used for the neighbor blocks of the current picture are assumed to be stored in the merge block candidate calculation unit 111.

The inter prediction control unit 109 performs inter prediction coding at a prediction mode having the smallest prediction error between (a) a prediction mode for an inter prediction image generated by using a motion vector derived by the motion estimation mode and (b) a prediction mode for an inter prediction image generated by using a motion vector derived at the merge mode. Moreover, the inter prediction control unit 109 provides the variable length coding unit 113 with (a) a merge flag indicating whether or not the prediction mode is the merge mode, (b) a merge block index value corresponding to the determined merge block if the merge mode is selected as the prediction mode, and (c) prediction error information. Furthermore, the inter prediction control unit 109 transfers colPic information including the motion vector and the like for the current block, to the colPic memory 112.

The variable length coding unit 113 performs variable length coding on the quantized prediction error data, merge flag, merge block index value, and picture type information, so as to generate a bitstream.

Figure 5:
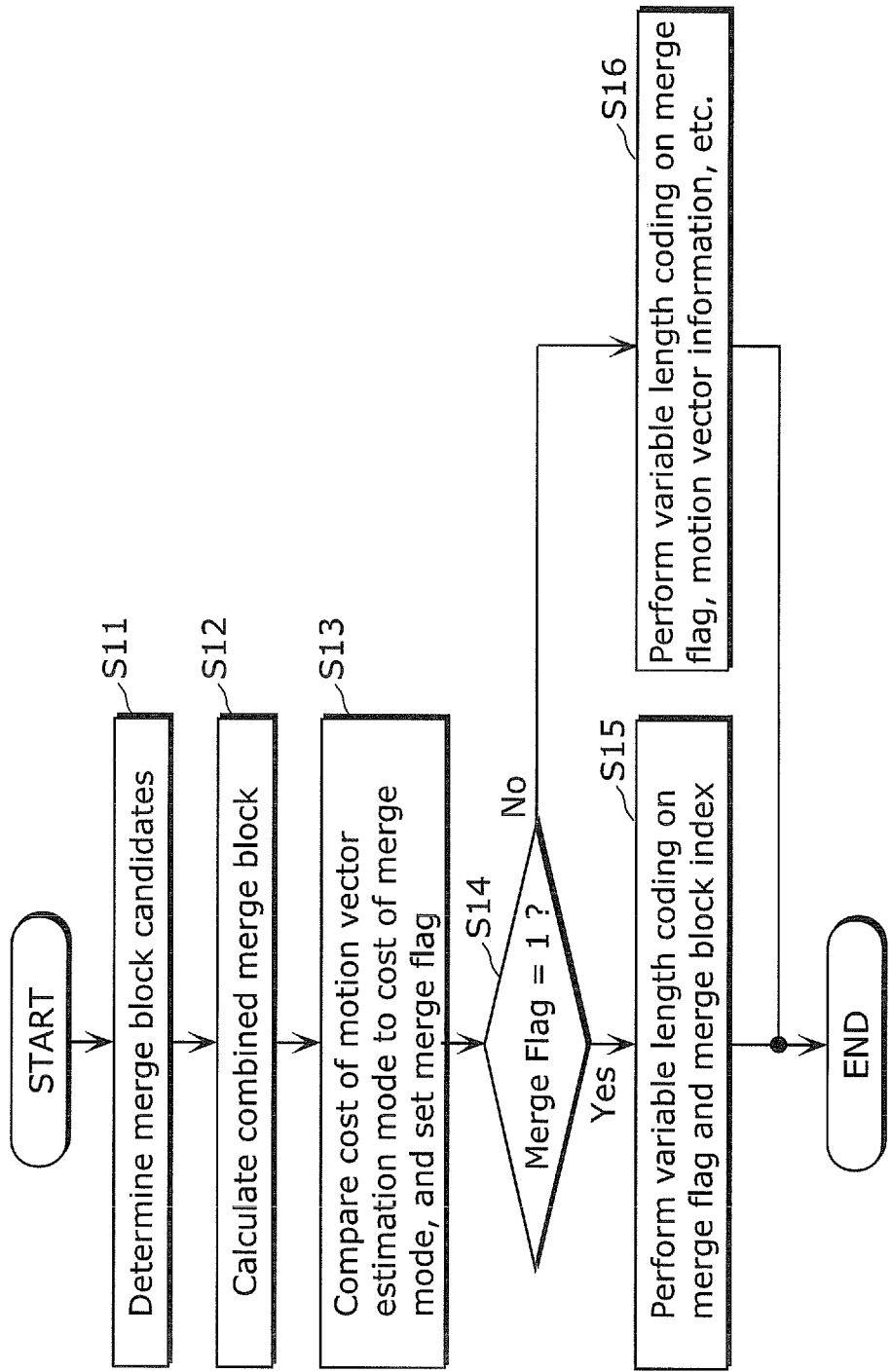
FIG. 5 is a flowchart of a summary of a processing flow of the moving picture coding method according to the embodiment of the present disclosure.

FIG. 5 is a flowchart of a summary of a processing flow of the moving picture coding method according to the present embodiment.

The merge block candidate calculation unit 111 specifies merge block candidates from neighbor blocks and a co-located block of a current block to be coded (Step S11). For example, in the situation shown in FIG. 3A, the merge block candidate calculation unit 111 specifies the neighbor blocks A, B, C, D, and a co-located merge block, as merge block candidates. Here, the co-located merge block includes at least one motion vector and the like which are calculated at the temporal prediction mode from at least one motion vector of the co-located block. Then, the merge block candidate calculation unit 111 assigns each of the merge block candidates with a corresponding value of the merge block index as shown in FIG. 3B. In general, as a value of the merge block index is smaller, a necessary information amount is decreased. On the other hand, as a value of the merge block index is larger, a necessary information amount is increased. Therefore, if a merge block index value corresponding to a merge block candidate having a high possibility of having a more accurate motion vector and a more accurate reference picture index value is decreased, coding efficiency is increased. For example, it can be considered that how many times each merge block candidate has been selected as a merge block is counted, and a smaller value of the merge block index is assigned to a block having the greater counts. Here, if a target merge block candidate does not hold information such as a motion vector, for example, if the merge block candidate is a block coded by intra prediction, or if the merge block candidate is located outside a picture boarder or a slice boarder, it is assumed that such a block cannot be used as a merge block candidate. In the present embodiment, if a block cannot be used as a merge block candidate, the block is referred to as a non-available block, and if a block can be used as a merge block candidate, the block is referred to as an available block. In the situation shown in FIG. 3A, since the neighbor block C is a block coded by intra prediction, the neighbor block C is considered as not being available as a non-available block as a merge block candidate.

By using the merge block candidates specified at S11, the merge block candidate calculation unit 111 generates a combined merge block by the method as described later, so as to update the merge block candidate list (Step S12). For example, the merge block candidate list shown in FIG. 6 is generated from the merge block candidate list shown in FIG. 3B. In the merge block candidate list in FIG. 3B, the combined merge block generated by the method described later is used instead of a non-available candidate having a value "3" of the merge block index. By using such a newly generated combined merge block instead of the non-available candidate, it is possible to improve coding efficiency without changing a maximum value of the number of merge block candidates.

Next, the inter prediction control unit 109 compares (a) the prediction error of the inter prediction image generated by using the motion vector derived by motion estimation to (b) the prediction error of the prediction image generated by the merge block candidate by the method described later, so as to determine a prediction mode for coding the current block. Here, if it is determined that the prediction mode is the merge mode, then the inter prediction control unit 109 determines a value of the merge block index indicating which merge block candidate is to be used. Then, if the prediction mode is the merge mode, then the inter prediction control unit 109 sets the merge flag to 1, otherwise, sets the merge flag to 0 (Step S13). The inter prediction control unit 109 determines whether or not the merge flag is 1, in other words, whether or not the prediction mode is the merge mode (Step S14). As a result, if the prediction mode is the merge mode (Yes at Step S14), then the inter prediction control unit 109 provides the variable length coding unit 113 with the merge flag and the merge block index value to be used for the merge, so as to add the merge flag and the index value into a bitstream (Step S15). On the other hand, if the prediction mode is not the merge mode (No at Step S14), then the inter prediction control unit 109 provides the variable length coding unit 113 with the merge flag and information of the motion estimation vector mode, so as to add the merge flag and the information into the bitstream (Step S16).

It should be noted in the present embodiment that, as shown in FIG. 3B, regarding the merge block index values, a value corresponding to the neighbor block A is "0", a value corresponding to the neighbor block B is "1", a value corresponding to the co-located merge block is "2", a value corresponding to the neighbor block C is "3", and a value corresponding to the neighbor block D is "4". However, the way of assigning values of the merge block index is not limited only to the example. For instance, it is also possible that the largest value is assigned to a non-available candidate as a merge block candidate. It should also be noted that the merge block candidates are not limited to the neighbor blocks A, B, C, and D. For example, a neighbor block or the like that is located above the immediately-lower-left block D may be selected as a merge block candidate. It should also be noted that it is not necessary to use all of the neighbor blocks, but only the neighbor blocks A and B may be used as the merge block candidates. It should also be noted that it is not necessary to always use the co-located merge block.

It should also be noted that it has been described in the present embodiment at S15 in FIG. 5 that the inter prediction control unit 109 provides a value of the merge block index to the variable length coding unit 113 so as to add the merge block index value into the bitstream, but it is also possible not to add the merge block index value if the number of the merge block candidates is 1. Thereby, it is possible to reduce an information amount of the merge block index.

It should also be noted that it has been described in the present embodiment at S12 in FIG. 5 that a combined merge block is used instead of a non-available candidate having a value "3" of the merge block index. However, the present disclosure is not limited to the above and the combined merge block may be further added in the merge block candidate list. Thereby, it is possible to increase the selection range of the merge block candidates. Here, it is also possible that the non-available candidate is treated as a candidate having the motion vector 0 and the reference picture index 0.

FIG. 7 shows an example of a coding table which is used to perform variable length coding on merge block index values.

In the example shown in FIG. 7, a code having a shorter code length is assigned to a smaller value of the merge block index. Therefore, if a merge block index value corresponding to a merge block candidate having a possibility of a high prediction accuracy is decreased, it is possible to improve coding efficiency.

It should be noted that it has been described in the present embodiment that variable length coding is performed on merge block index values as shown in FIG. 7, but the merge block index values may be coded with a fixed code length. Thereby, it is possible to reduce a load on coding or decoding processing.

Figure 8:
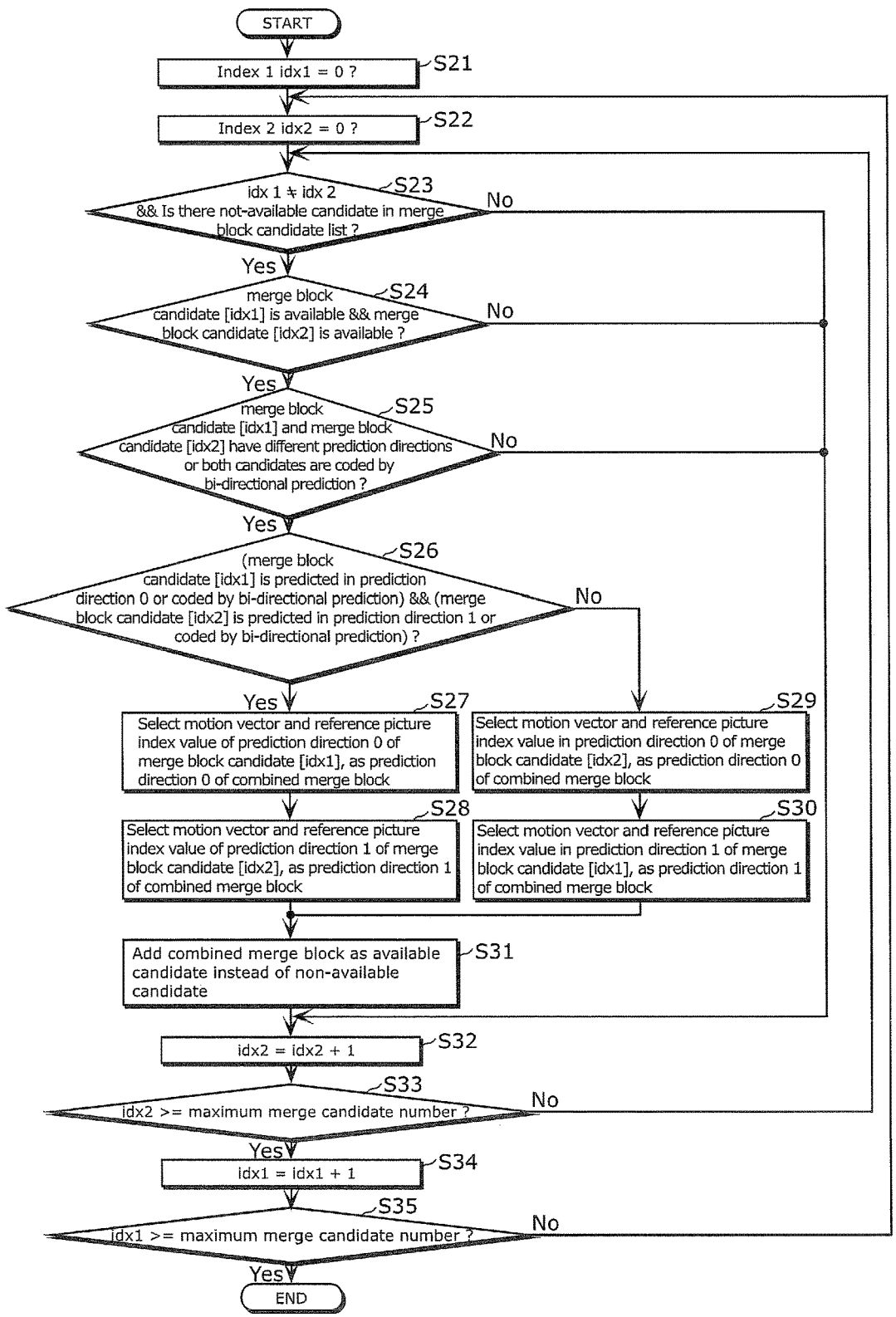
FIG. 8 is a flowchart of a detailed processing flow for calculating a combined merge block.

FIG. 8 is flowchart of a detailed flow of S12 in FIG. 5. The following describes the method of generating a combined merge block from the merge block candidates specified at S11 with reference to FIG. 8.

The merge block candidate calculation unit 111 initializes an index value 1 (idx1) to "0" (Step S21). Then, the merge block candidate calculation unit 111 initializes an index value 2 (idx2) to "0" (Step S22). The merge block candidate calculation unit 111 determines whether or not the idx1 and the idx2 have different values and the merge block candidate list includes any non-available candidate (Step S23). As a result, if there is a non-available candidate (Yes at Step S23), then the merge block candidate calculation unit 111 determines whether or not the merge block candidate [idx1] assigned with the merge block index value idx1 is available and the merge block candidate [idx2] assigned with the merge block index value idx2 is available (Step S24). As a result, if the merge block candidate [idx1] is available and the merge block candidate [idx2] is also available (Yes at Step S24), then the merge block candidate calculation unit 111 determines whether or not the merge block candidate [idx1] and the merge block candidate[idx2] have been predicted in different prediction directions, or both the merge block candidate [idx1] and the merge block candidate [idx2] have been coded by bi-directional prediction (Step S25). As a result, if the merge block candidate [idx1] and the merge block candidate[idx2] have been predicted in different prediction directions, or both the merge block candidate [idx1] and the merge block candidate [idx2] have been coded by bi-directional prediction (Yes at Step S25), then the merge block candidate calculation unit 111 determines whether or not the merge block candidate [idx1] has been predicted in the prediction direction 0 (the first prediction direction) or coded by the bi-directional prediction, and the merge block candidate [idx2] has been predicted in the prediction direction 1 (the second prediction direction) or coded by the bi-directional prediction (Step S26). As a result, if the merge block candidate [idx1] has been predicted in the prediction direction 0 or coded by the bi-directional prediction, and the merge block candidate [idx2] has been predicted in the prediction direction 1 or coded by the bi-directional prediction (Yes at Step S26), in other words, if the merge block candidate [idx1] has at least a motion vector of the prediction direction 0 and the merge block candidate [idx2] has at least a motion vector of the prediction direction 1, then the merge block candidate calculation unit 111 selects the motion vector and the reference picture index value of the prediction direction 0 of the merge block candidate [idx1] for the prediction direction 0 of the combined merge block (Step S27). In addition, the merge block candidate calculation unit 111 selects the motion vector and the reference picture index value of the prediction direction 1 of the merge block candidate [idx2] for the prediction direction 1 of the combined merge block, so as to generate the combined merge block of bi-directional prediction (Step S28). On the other hand, if it is not determined that the merge block candidate [idx1] has been predicted in the prediction direction 0 or coded by the bi-directional prediction, and the merge block candidate [idx2] has been predicted in the prediction direction 1 or coded by the bi-directional prediction (No at Step S26), then the merge block candidate calculation unit 111 selects the motion vector and the reference picture index value of the prediction direction 0 of the merge block candidate [idx2] for the prediction direction 0 of the combined merge block (Step S29). In addition, the merge block candidate calculation unit 111 selects the motion vector and the reference picture index value of the prediction direction 1 of the merge block candidate [idx1] for the prediction direction 1 of the combined merge block, so as to generate the combined merge block of bi-directional prediction (Step S30). The merge block candidate calculation unit 111 adds the generated combined merge block into the merge block candidate list as an available candidate, instead of the non-available candidate (Step S31). Next, the merge block candidate calculation unit 111 adds a value "1" to the value idx2 (Step S32), and determines whether or not the value idx2 is equal to or greater than the maximum value of the number of the merge block candidates (Step S33). As a result, if the value idx2 is not equal to or greater than the maximum value of the number of the merge block candidates (No at Step S33), the processing returns to Step S23, then the merge block candidate calculation unit 111 determines again whether or not any non-available candidate remains, and generates a next combined merge block (Steps S23 to S32). On the other hand, if the value idx2 is equal to or greater than a maximum value of the number of the merge block candidates (Yes at Step S33), then the merge block candidate calculation unit 111 adds a value "1" to the idx1 (Step S34) and determines whether or not the idx1 is equal to or greater than the maximum value of the number of the merge block candidates (Step S35). As a result, if the idx1 is equal to or greater than the maximum value of the number of the merge block candidates (Yes at Step S35), in other words, if every combination of the merge block candidates has been examined, the processing is completed.

It should be noted that it has been described in the present embodiment that the processing is completed when every combination of the merge block candidates has been examined, but the present disclosure is not limited to the above. For example, it is possible to complete the processing when there is no more non-available candidate in the merge block candidate list. As a result, a processing amount can be reduced.

It should also be noted that it has been described in the present embodiment that the steps in the method of generating a combined merge block from merge block candidates are performed in the order shown in the flowchart of FIG. 8, but the present disclosure is not limited to the above and the order of the steps may be changed.

It should also be noted that it has been described in the present embodiment that, for example, when a motion vector and a reference picture index value of the prediction direction regarding a neighbor block is selected for the prediction direction 0 of the combined merge block, if there are a plurality of merge block candidates having a motion vector and a reference picture index value of the prediction direction 0, the motion vector and the reference picture index value of the prediction direction 0 which are regarding the merge block candidate having the merge block index value that is closer to "0" is selected. However, the present disclosure is not limited to the above. For example, it is also possible to select a motion vector and a reference picture index value of the prediction direction 0 which are regarding a merge block candidate having a merge block index value that is closer to a maximum value.

It should also be noted that it has been described in the present embodiment at S31 in FIG. 8 that the generated combined merge block is added to the merge block candidate list as an available candidate instead of a non-available candidate, but the present disclosure is not limited to the above. For example, it is also possible that it is determined whether or not any other merge block candidate holding the same motion vector and the same value of the reference picture index as those of the combined merge block is already included in the merge block candidate list, and if there is no such a candidate in the list, the combined merge block is added to the merge block candidate list as an available candidate instead of a non-available candidate. Thereby, by preventing that the same merge block candidate is added again, it is possible to add effective merge block candidates. As a result, coding efficiency can be improved.

It should also be noted that it has been described in the present embodiment that the generated combined merge block is added to the merge block candidate list when there is a non-available candidate in the merge block candidate list, but the present disclosure is not limited to the above. For example, it is also possible at S23 in FIG. 8 that the determination as to whether or not there is a non-available candidate in the merge block candidate list is not made, but the combined merge block is calculated and newly added to the merge block candidate list. Thereby, it is possible to increase the selection range of the merge block candidates. As a result, coding efficiency can be improved.

Figure 9:
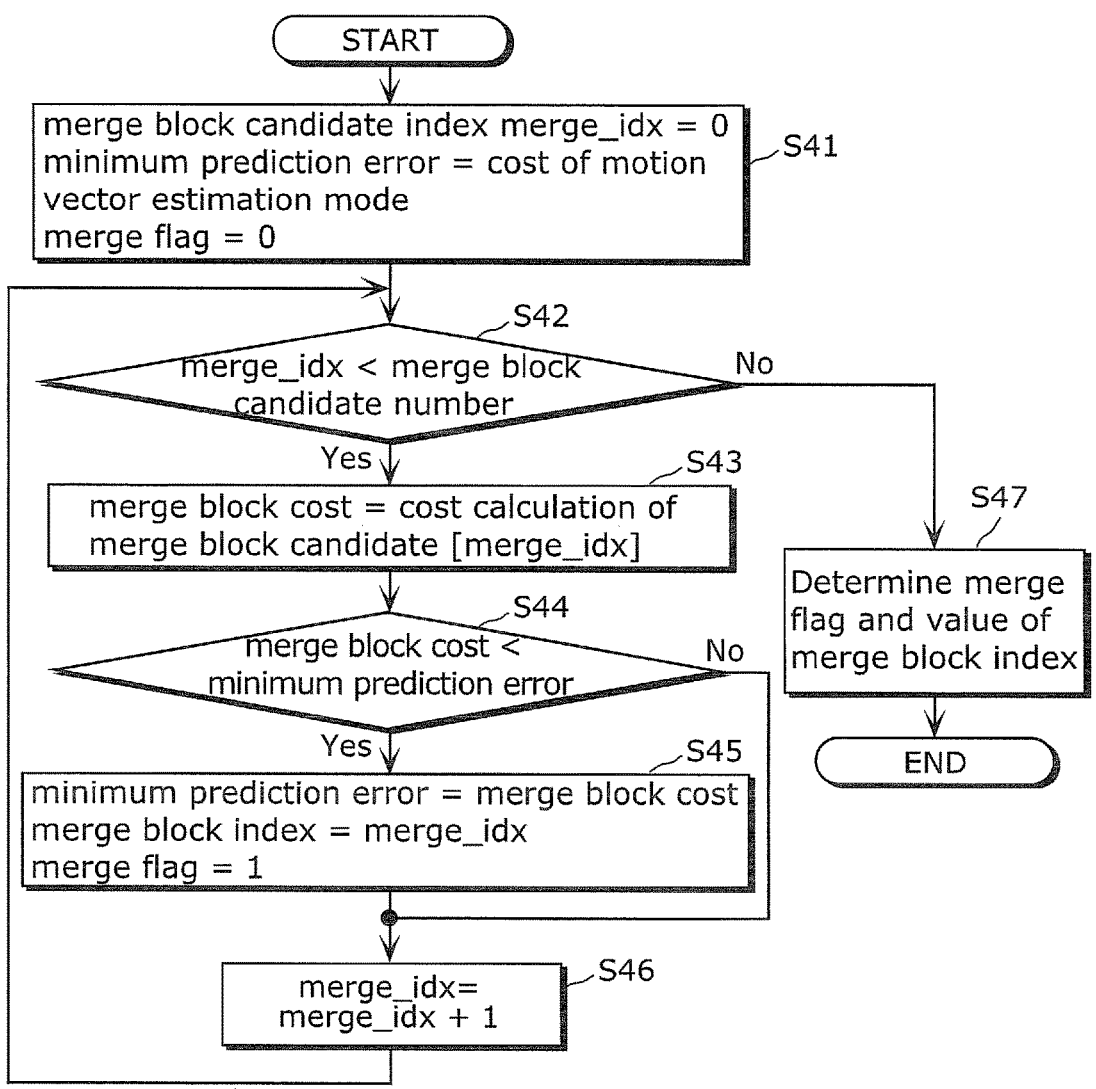
FIG. 9 is a flowchart of a detailed processing flow for comparing prediction errors.

FIG. 9 is flowchart of a detailed flow of S13 in FIG. 5. The following describes with reference to FIG. 9.

The inter prediction control unit 109 sets a value of the merge block candidate index to "0", the minimum prediction error to a prediction error (cost) of the motion vector estimation mode, and the merge flag to "0" (Step S41). Here, the cost is calculated by, for example, the following Equation 1 of the R-D optimization model.

$$Cost=D+\lambda \times R \qquad \text{(Equation 1)}$$

In Equation 1, D represents a coding distortion which is, for example, a sum of absolute values of difference of (a) a pixel value obtained by coding and decoding a current block by using a prediction image generated by a certain motion vector and (b) an original pixel value of the current block. Furthermore, R represents a coding amount which is, for example, a coding amount required to code the motion vector used in generating the prediction image. λ represents a Lagrange's method of undetermined multipliers.

Then, the inter prediction control unit 109 determines whether or not a value of the merge block candidate index is smaller than the number of merge block candidates of the current block, in other words, whether or not there is any block having a possibility of being a merge candidate (Step S42). As a result, if it is determined that the value of the merge block candidate index is smaller than the number of merge block candidates of the current block (Yes at Step S42), then the inter prediction control unit 109 calculates a cost of the merge block candidate assigned with the value of the merge block candidate index (Step S43). Next, the inter prediction control unit 109 determines whether or not the calculated cost of the merge block candidate is smaller than the minimum prediction error (Step S44). As a result, if the calculated cost of the merge block candidate is smaller than the minimum prediction error (Yes at Step S44), then the inter prediction control unit 109 updates the minimum prediction error, the value of the merge block index, and the value of the merge flag (Step S45). Next, the inter prediction control unit 109 adds a value of "1" to the value of the merge block candidate index (Step S46), and the processing repeats from S42 to S46. If the calculated cost of the merge block candidate is not smaller than the minimum prediction error (No at Step S44), then the updating process at S45 is not performed but Step 46 is performed, and the processing repeats from S42 to S46. Here, at Step S42, if the value of the merge block candidate index is not smaller than the number of the merge block candidates (No at Step S42), in other words, if there is no merge block candidate, then the inter prediction control unit 109 eventually determines the finally left merge flag and the value of the merge block index (Step S47).

According to the present embodiment of the present disclosure, a new merge block candidate of bi-directional prediction is calculated from merge block candidates, so as to improve coding efficiency. More specifically, based on the merge block candidates calculated from the neighbor blocks and the co-located block, (a) a motion vector and a reference picture index value of the prediction direction 0 and (b) a motion vector and a reference picture index value of the prediction direction 1 are combined to generated a combined merge block of bi-directional prediction, and then added to the merge block candidate list. As a result, coding efficiency can be improved. Furthermore, if there is a non-available candidate in the merge block candidate list, a combined merge block is generated and the non-available candidate is replaced by the combined merge block. Thereby, coding efficiency can be improved without increasing a maximum value of the number of merge block candidates.

It should be noted that it has been described in the present embodiment that the merge flag is always added to a bitstream at the merge mode, but the present disclosure is not limited to the above. For example, it is also possible that it is forced to select the merge mode according to a shape or the like of the current block. In this case, it is possible that an information amount is reduced by not adding the merge flag to the bitstream It should be noted that it has been described in the present embodiment that, at the merge mode, at least one motion vector and at least one reference picture index value are copied from a neighbor block of the current block and then used to code the current block, but the present disclosure is not limited to the above. For example, the following is also possible. In the same manner as at the merge mode, by using the merge block candidates generated as shown in FIG. 6, at least one motion vector and at least one reference picture index value are copied from a neighbor block of the current block and then used to code the current block. As a result, if every prediction error data of the current block is 0, a skip flag is set to 1 and added to the bitstream. On the other hand, if every prediction error data is not 0, the skip flag is set to 0 and the skip flag and the prediction error data are added to the bitstream (merge skip mode).

It should also be noted that it has been described in the present embodiment that, at the merge mode, at least one motion vector and at least one reference picture index value are copied from a neighbor block of the current block and then used to code the current block, but the present disclosure is not limited to the above. For example, it is also possible that a motion vector at the motion vector estimation mode is coded by using the merge block candidate list generated as shown in FIG. 6. More specifically, it is possible that a motion vector of a merge block candidate designated by the merge block index value is subtracting from the motion vector of the motion vector estimation mode, so as to obtain a difference, and that the difference and the merge block candidate index value are added to the bitstream. Furthermore, the following is also possible. By using a reference picture index value RefIdx_ME of the motion estimation mode and a reference picture index value RefIdx_Merge of the merge block candidate, scaling is performed on a motion vector MV_Merge of the merge block candidate. Then, a motion vector scaledMV_Merge of the scaled merge block candidate is subtracting from the motion vectors at the motion estimation mode to obtain a difference. The difference and the value of the merge block candidate index are added to the bitstream. This scaling can be performed by using the following Equation 2.

$$scaledMV\_Merge=MV\_Merge \times (POC(RefIdx\_ME)-curPOC)/(POC(RefIdx\_Merge)-curPOC) \qquad \text{(Equation 2)}$$

Here, POC(RefIdx_ME) represents a location in a display order of a reference picture indicated by the reference picture index value RefIdx_ME, POC(RefIdx_Merge) represents a location in the display order of a reference picture indicated by the reference picture index value RefIdx- _Merge, and curPOC represents a location in the display order of a picture to be coded

Embodiment 2

Figure 10:
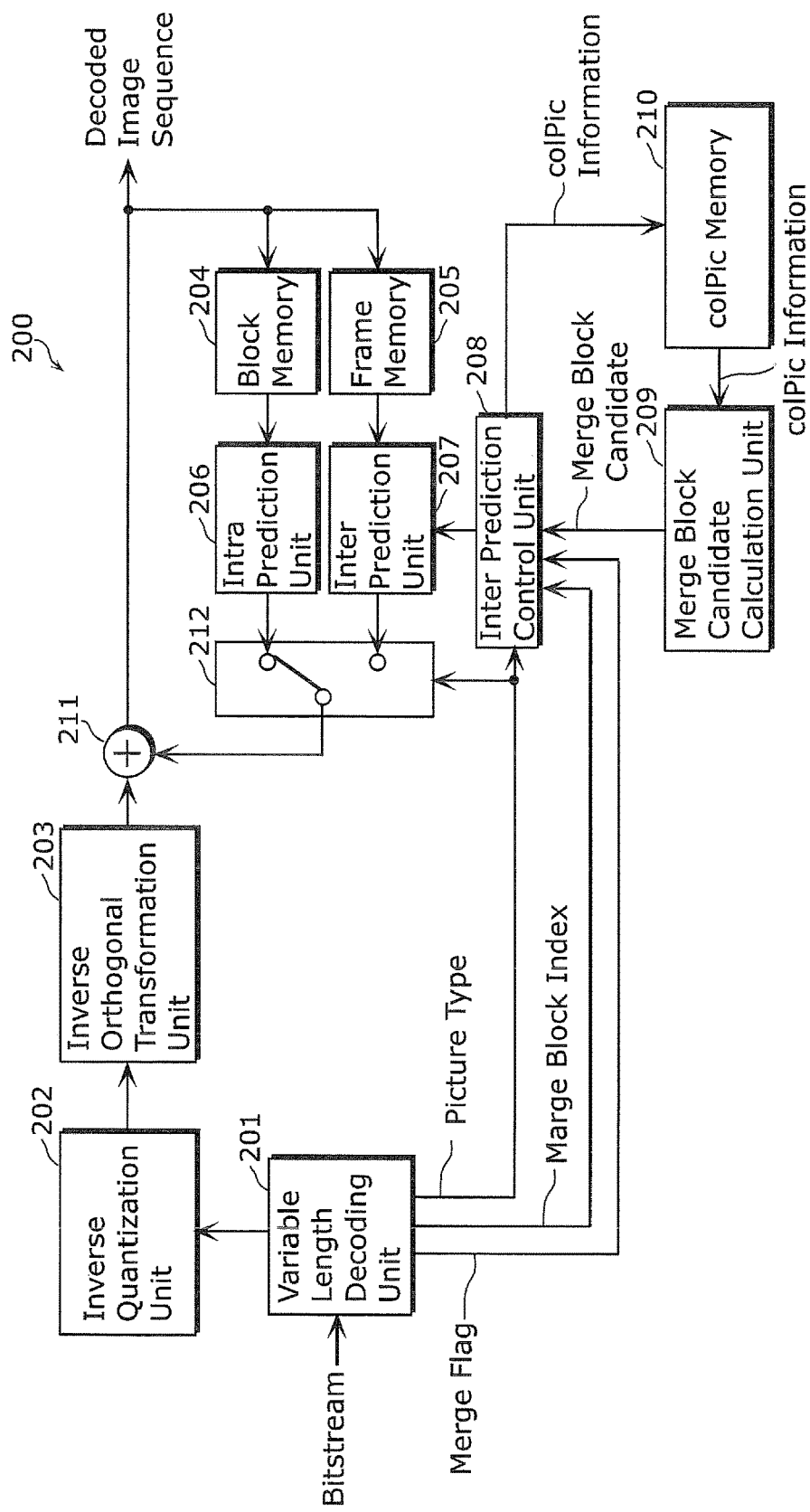
FIG. 10 is a block diagram showing a structure of a moving picture decoding apparatus using a moving picture decoding method according to an embodiment of the present disclosure.

FIG. 10 is a block diagram showing a structure of a moving picture decoding apparatus using a moving picture decoding method according to Embodiment 2 of the present disclosure.

As shown in FIG. 10, the moving picture decoding apparatus 200 includes a variable length decoding unit 201, an inverse quantization unit 202, an inverse orthogonal transformation unit 203, a block memory 204, a frame memory 205, an intra prediction unit 206, an inter prediction unit 207, an inter prediction control unit 208, a merge block candidate calculation unit 209, a colPic memory 210, an adder 211, and a switch 212.

The variable length decoding unit 201 performs variable length decoding on an input bitstream so as to obtain the picture type information, the merge flag, and the merge block index, and a variable-length-decoded bitstream. The inverse quantization unit 202 inversely quantizes the variable-length-decoded bitstream. The inverse orthogonal transformation unit 203 transforms the inversely-quantized bitstream from a frequency domain to an image domain, so as to generate prediction error image data. The block memory 204 holds an image sequence generated by adding the prediction error image data to prediction picture on a block-by-block basis. The frame memory 205 holds the image sequence on a picture-by-picture basis. The intra prediction unit 206 performs intra prediction on the image sequence stored in the block memory 204 on a block-by-block basis, so as to generate prediction image data of a current block to be decoded. The inter prediction unit 207 performs inter prediction on the image sequence stored in the frame memory on a picture-by-picture basis, so as to generate prediction image data of the current block to be decoded.

The merge block candidate calculation unit 209 derives merge block candidates of the merge mode, by using colPic information such as motion vectors of neighbor blocks and a co-located block stored in the colPic memory 210 regarding the current block. In addition, the merge block candidate calculation unit 209 assigns each of the derived merge blocks with a corresponding value of the merge block index. Then, the merge block candidate calculation unit 209 provides the merge block candidates and the values of the merge block index to the inter prediction control unit 208.

If the merge flag decoded by the variable length decoding unit 210 is "0", in other words, if the prediction mode is not the merge mode, the inter prediction control unit 208 generates inter prediction image using the decoded information of motion estimation mode. Furthermore, if the merge flag is "1", in other words, if the prediction mode is the merge mode, then the inter prediction control unit 208 determines a motion vector and a reference picture index value to be used in inter prediction from the plurality of merge block candidates, based on the decoded merge block index value, so as to generate inter prediction image. Moreover, the inter prediction control unit 208 provides the colPic memory 210 with colPic information including the motion vector and the like of the current block.

The adder 211 adds the prediction data generated by the intra prediction unit 206 or the inter prediction unit 207 to the prediction error data provided from the inverse orthogonal transformation unit 203, so as to generated a decoded image sequence.

Figure 11:
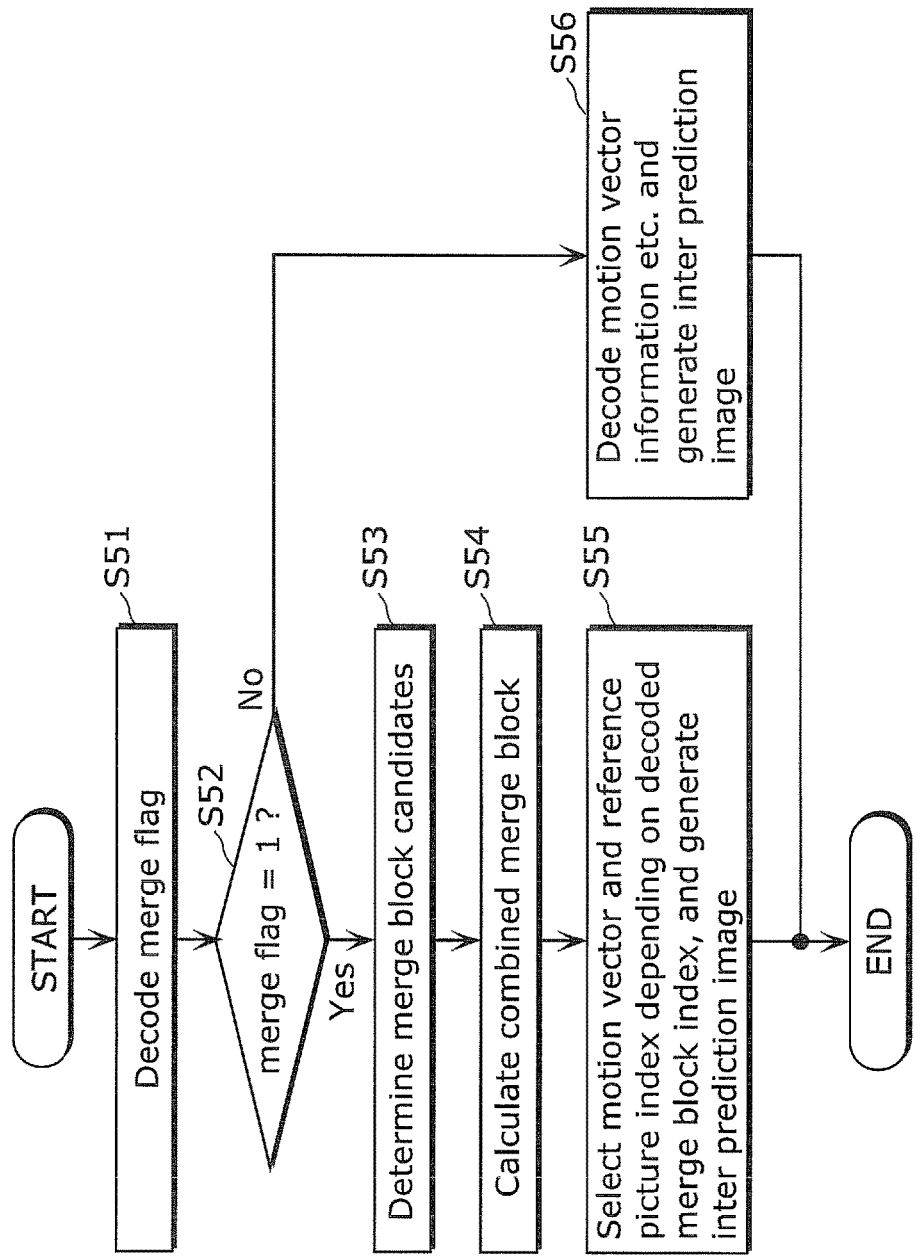
FIG. 11 is a flowchart of a summary of a processing flow of a moving picture decoding method according to an embodiment of the present disclosure.

FIG. 11 is a flowchart of a summary of a processing flow of the moving picture decoding method according to the present embodiment.

The variable length decoding unit 201 decodes a merge flag from a bitstream (Step S51). The inter prediction control unit 208 determines whether or not the merge flag is "1" (Step S52). As a result, if the merge flag is "1" (Yes at Step S52), then the merge block candidate calculation unit 209 specifies merge block candidates from neighbor blocks and a co-located block of a current block to be decoded (Step S53). In the same method as shown in FIG. 8, the merge block candidate calculation unit 209 generates a combined merge block, and updates the merge block candidate list (Step S54). Thereby, likewise the coding processing, for example, the merge block candidate list shown in FIG. 6 is generated from the merge block candidate list shown in FIG. 3B. The inter prediction control unit 208 determines a merge block from which at least one motion vector and at least one reference picture index value are copied, according to the merge block index value decoded by the variable length decoding unit 201, and generate inter prediction image using the determined merge block (Step S55). On the other hand, at Step S52, if the merge flag is "0", then the inter prediction control unit 208 generates inter prediction image using the information of motion vector estimation mode which is decoded by the variable length decoding unit 201 (Step S56). It should be noted that, if the number of the merge block candidates specified or generated at S53 and S54 is one, it is possible not to decode a value of the merge block index but to estimate the value of the merge block index as 0.

According to the present embodiment of the present disclosure, a new merge block of bi-directional prediction is calculated from merge block candidates, so as to appropriately decode a bitstream with improved coding efficiency.

More specifically, based on the merge block candidates calculated by the neighbor blocks and the co-located block, (a) a motion vector and a the reference picture index value of the prediction direction 0 and (b) a motion vector and a reference picture index value of the prediction direction 1 are combined to generate a combined merge block of bi-directional prediction, and added to the merge block candidate list. As a result, it is possible appropriately decode the bitstream with improved coding efficiency. Furthermore, if there is a non-available candidate in the merge block candidate list, a combined merge block is calculated and the non-available candidate is replaced by the combined merge block. Thereby, it is possible appropriately decode the bitstream with improved coding efficiency, without increasing a maximum value of the number of merge block candidates.

Embodiment 3

The processing described in each of Embodiments can be simply implemented in an independent computer system, by recording, in a recording medium, a program for implementing the configurations of the moving picture coding method (image coding method) and the moving picture decoding method (image decoding method) described in each of Embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of Embodiments and systems using thereof will be described. The system has a feature of having an image coding and decoding apparatus that includes an image encoding apparatus using the image encoding method and an image decoding apparatus using the image decoding method. Other configurations in the system can be changed as appropriate depending on the cases.

Figure 12:
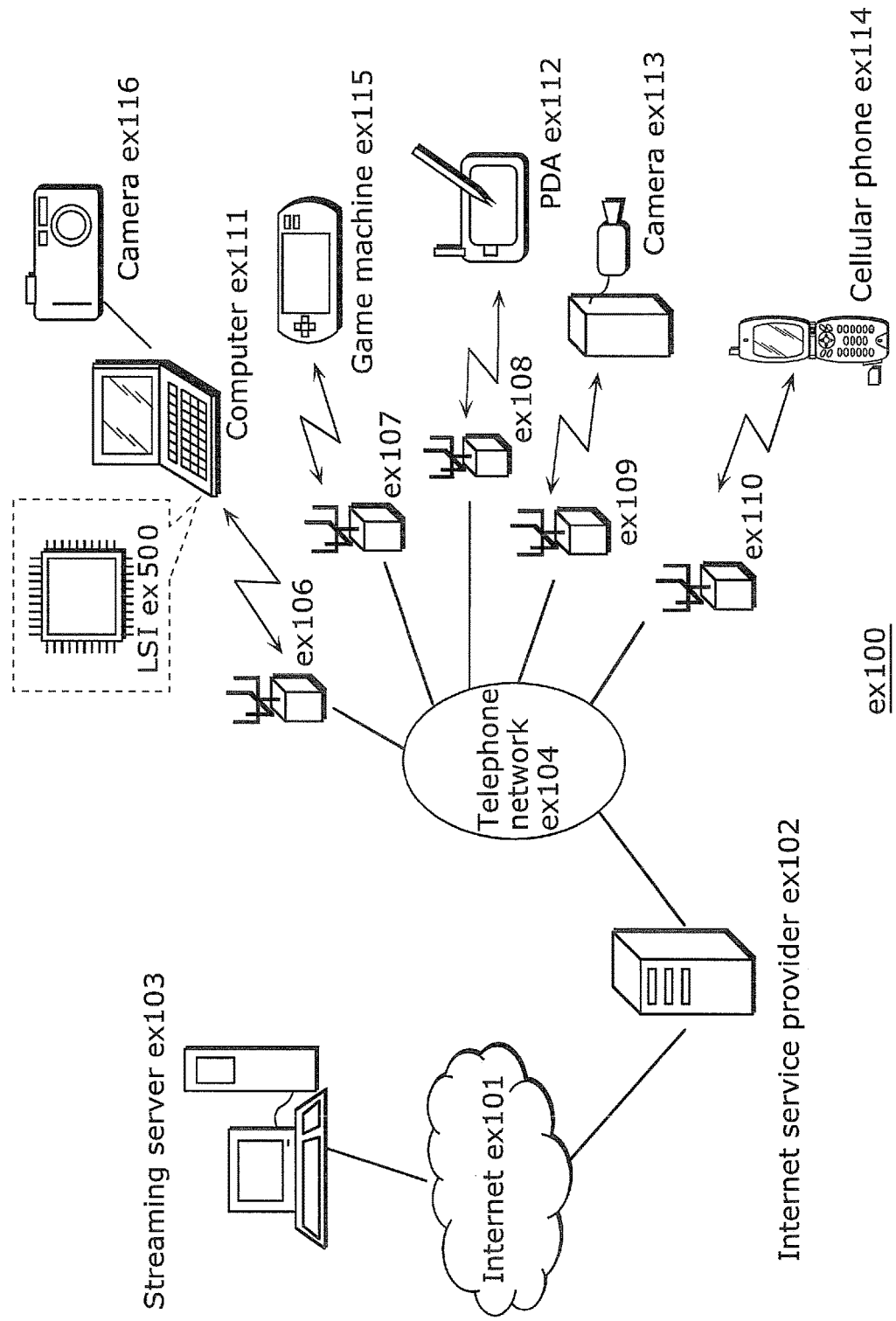
FIG. 12 shows an overall configuration of a content providing system for implementing content distribution services.

FIG. 12 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 12, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital video camera, is capable of capturing both still images and video. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of Embodiments (i.e., the camera functions as the image coding apparatus of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., the devices each function as the image decoding apparatus of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 13:
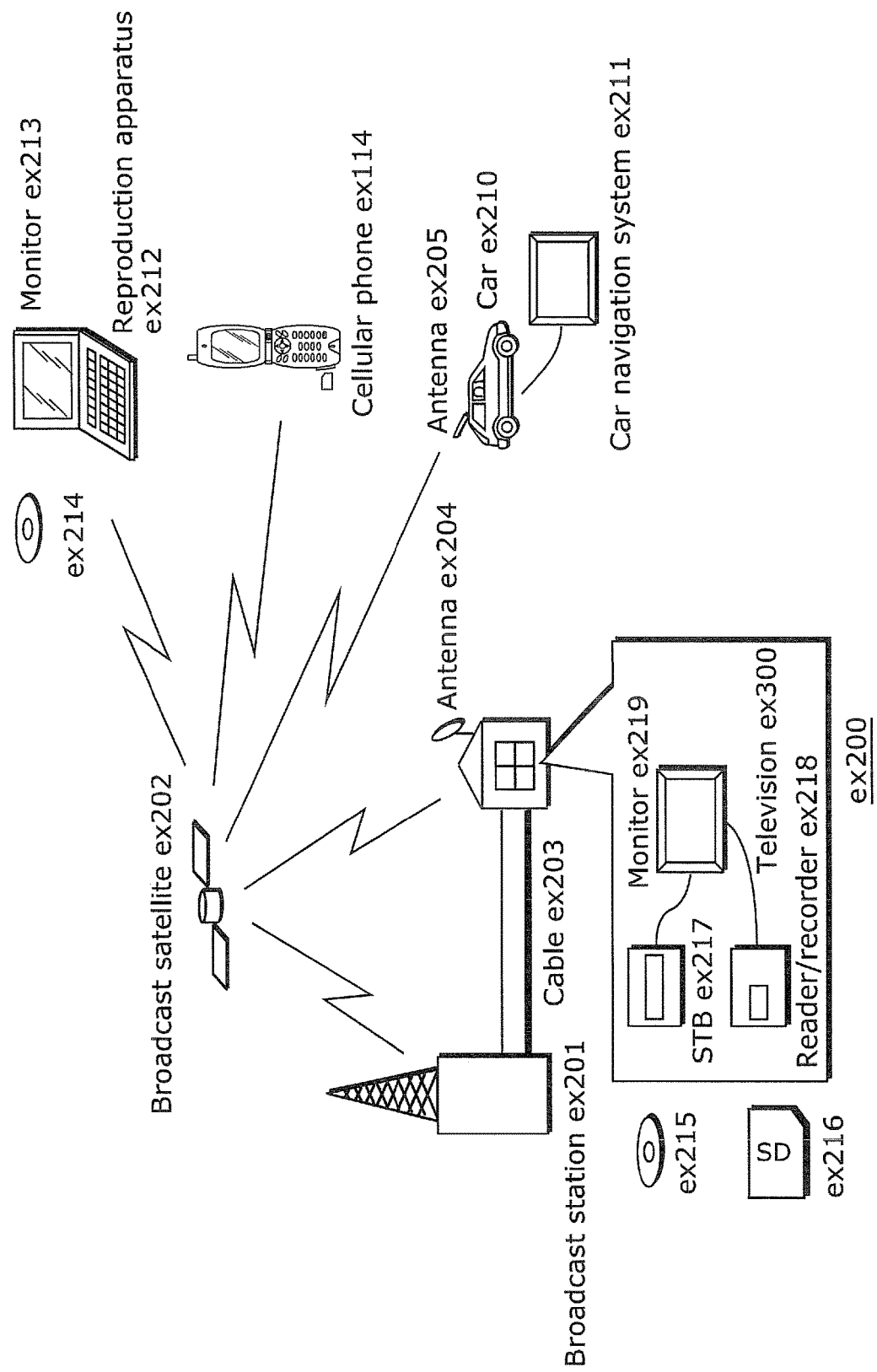
FIG. 13 shows an overall configuration of a digital broadcasting system.

Aside from the example of the content providing system ex100, at least one of the moving picture coding apparatus (image coding apparatus) and the moving picture decoding apparatus (image decoding apparatus) described in each of Embodiments may be implemented in a digital broadcasting system ex200 illustrated in FIG. 13. More specifically, a broadcast station ex201 communicates or transmits, via radio waves to a broadcast satellite ex202, multiplexed data obtained by multiplexing audio data and others onto video data. The video data is data coded by the moving picture coding method described in each of Embodiments (i.e., data coded by the image coding apparatus of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., the device functions as the image coding apparatus of the present invention).

Furthermore, a reader/recorder ex218 (i) reads and decodes the multiplexed data recorded on a recording media ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of Embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 14:
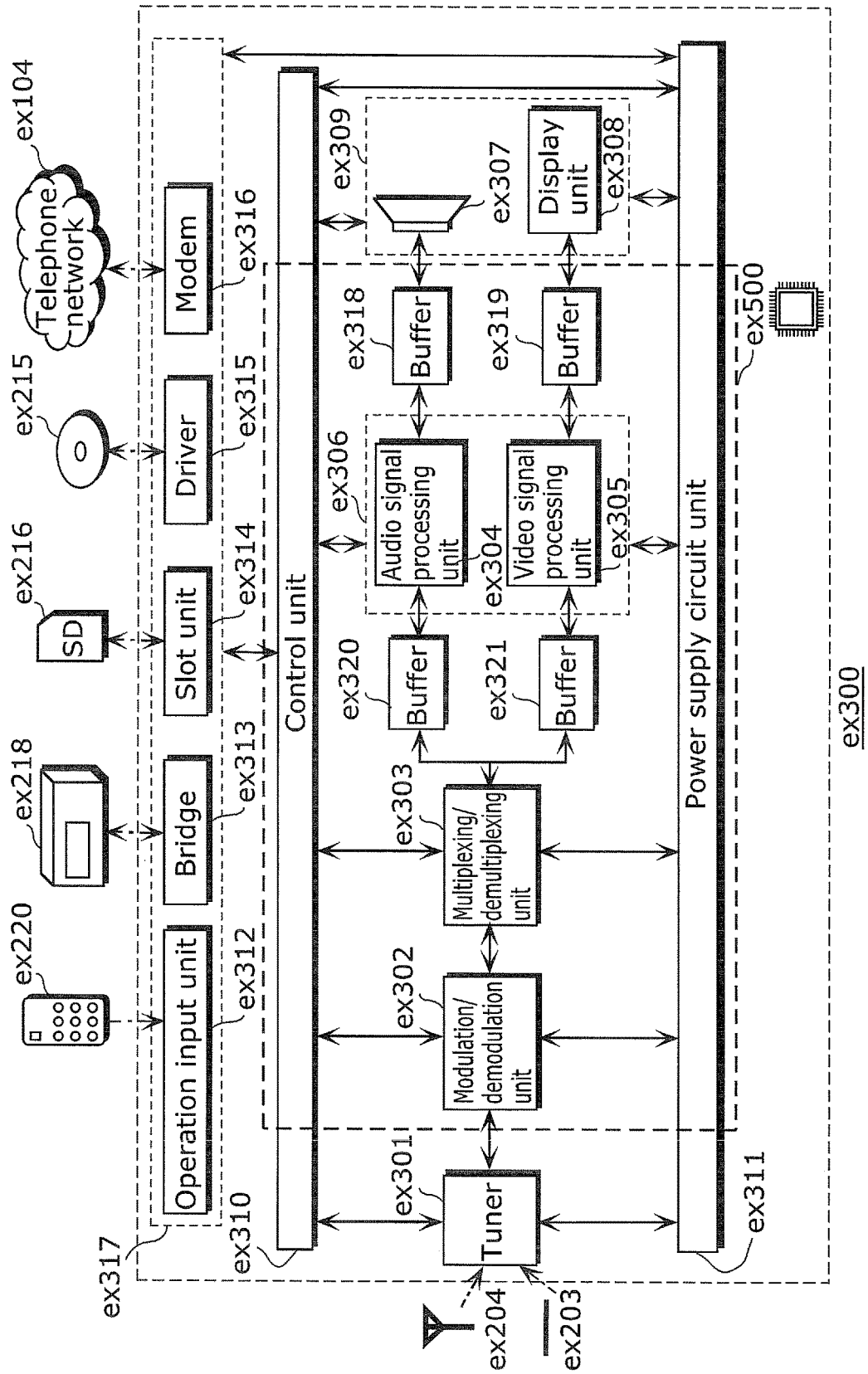
FIG. 14 shows a block diagram illustrating an example of a configuration of a television.

FIG. 14 illustrates the television (receiver) ex300 that uses the moving picture coding method and the moving picture decoding method described in each of Embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, (which function as the image coding apparatus and the image decoding apparatus), respectively; and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of Embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of Embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 15:
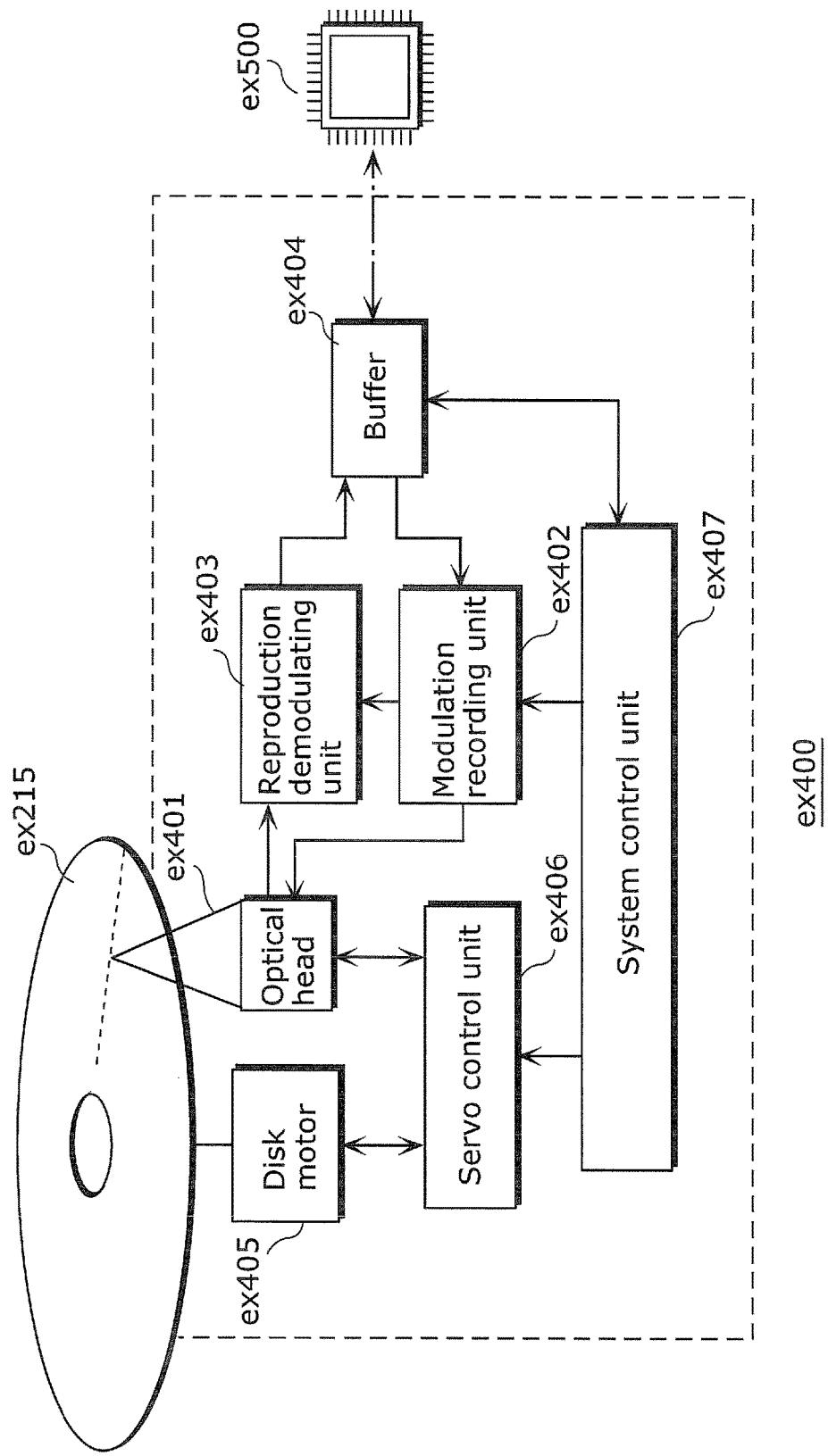
FIG. 15 shows a block diagram illustrating an example of a configuration of an information reproducing/recording unit that reads and writes information from and on a recording medium that is an optical disk.

As an example, FIG. 15 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 16:
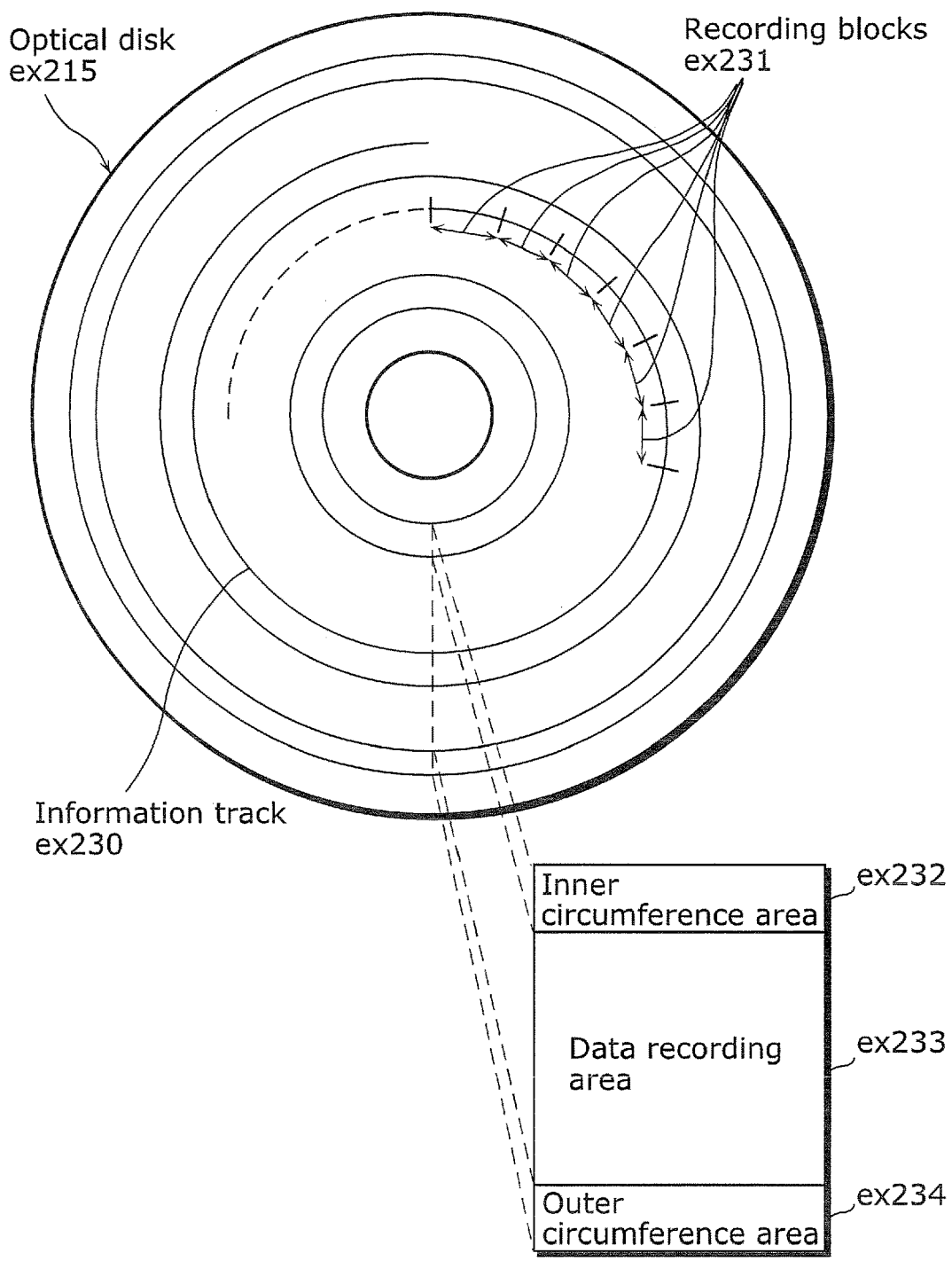
FIG. 16 shows an example of a configuration of a recording medium that is an optical disk.

FIG. 16 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 14. The same will be true for the configuration of the computer ex111, the cellular phone ex114, and others.

Figure 17A:
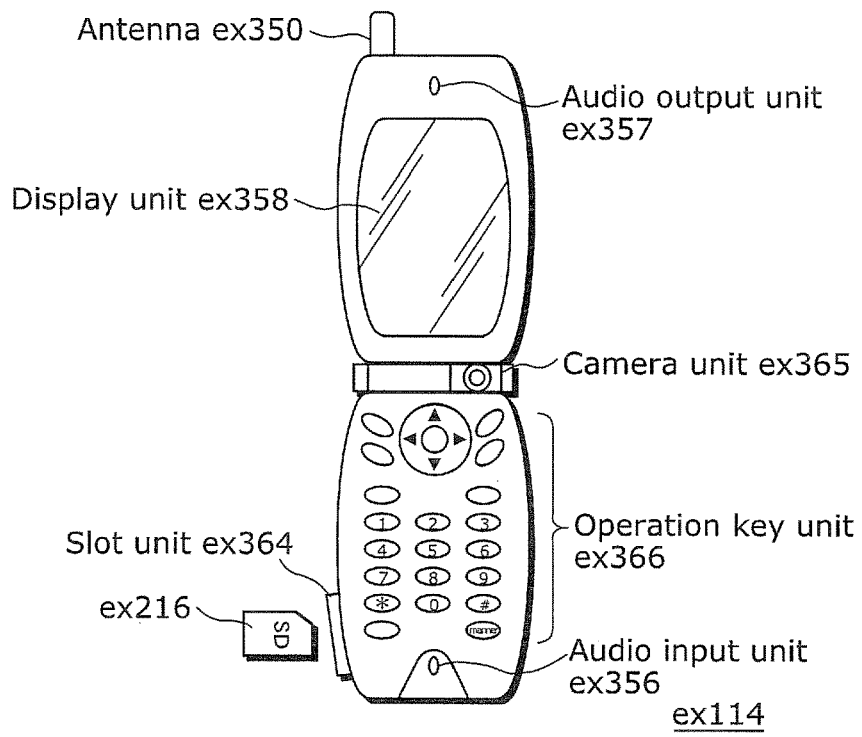
FIG. 17A shows an example of a cellular phone.

FIG. 17A illustrates the cellular phone ex114 that uses the moving picture coding method and the moving picture decoding method described in Embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 17B:
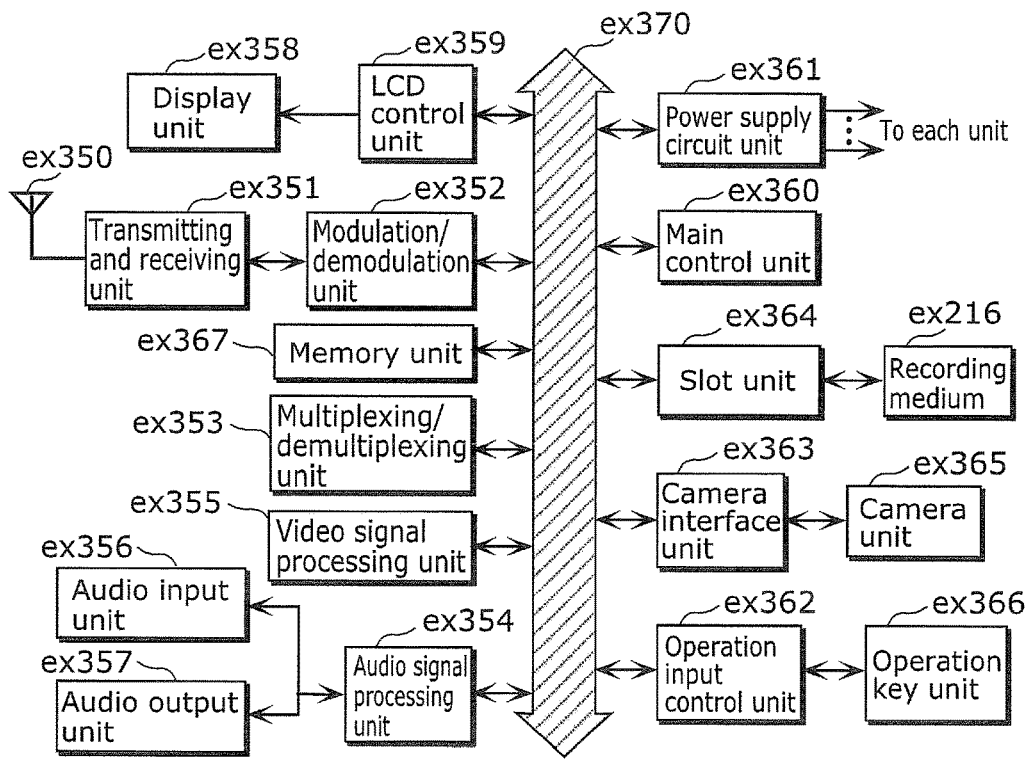
FIG. 17B is a block diagram showing an example of a configuration of a cellular phone.

Next, an example of a configuration of the cellular phone ex114 will be described with reference to FIG. 17B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of Embodiments (i.e., functions as the image coding apparatus of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of Embodiments (i.e., functions as the image decoding apparatus of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of Embodiments can be used in any of the devices and systems described. Thus, the advantages described in each of Embodiments can be obtained.

Furthermore, the present invention is not limited to Embodiments, and various modifications and revisions are possible without departing from the scope of the present invention.

Embodiment 4

Video data can be generated by switching, as necessary, between (i) the moving picture coding method or the moving picture coding apparatus shown in each of Embodiments and (ii) a moving picture coding method or a moving picture coding apparatus in conformity with a different standard, such as MPEG-2, MPEG4-AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of Embodiments will be hereinafter described. The multiplexed data is a digital stream in the MPEG2-Transport Stream format.

FIG. 18 illustrates a structure of the multiplexed data. As illustrated in FIG. 18, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of Embodiments, or in a moving picture coding method or by a moving picture coding apparatus in conformity with a conventional standard, such as MPEG-2, MPEG4-AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

Figure 19:
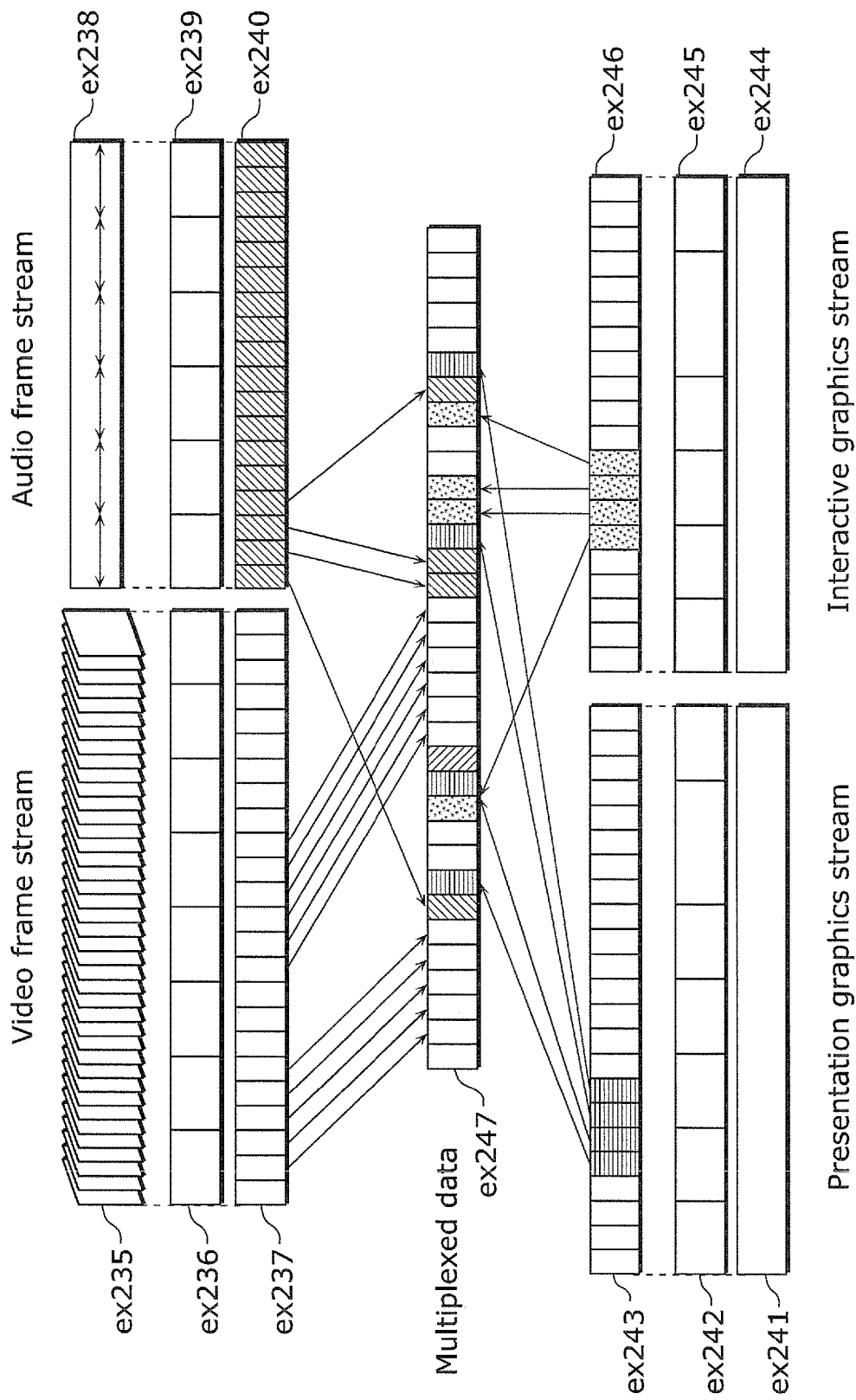
FIG. 19 schematically shows how each stream is multiplexed in multiplexed data.

FIG. 19 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 20:
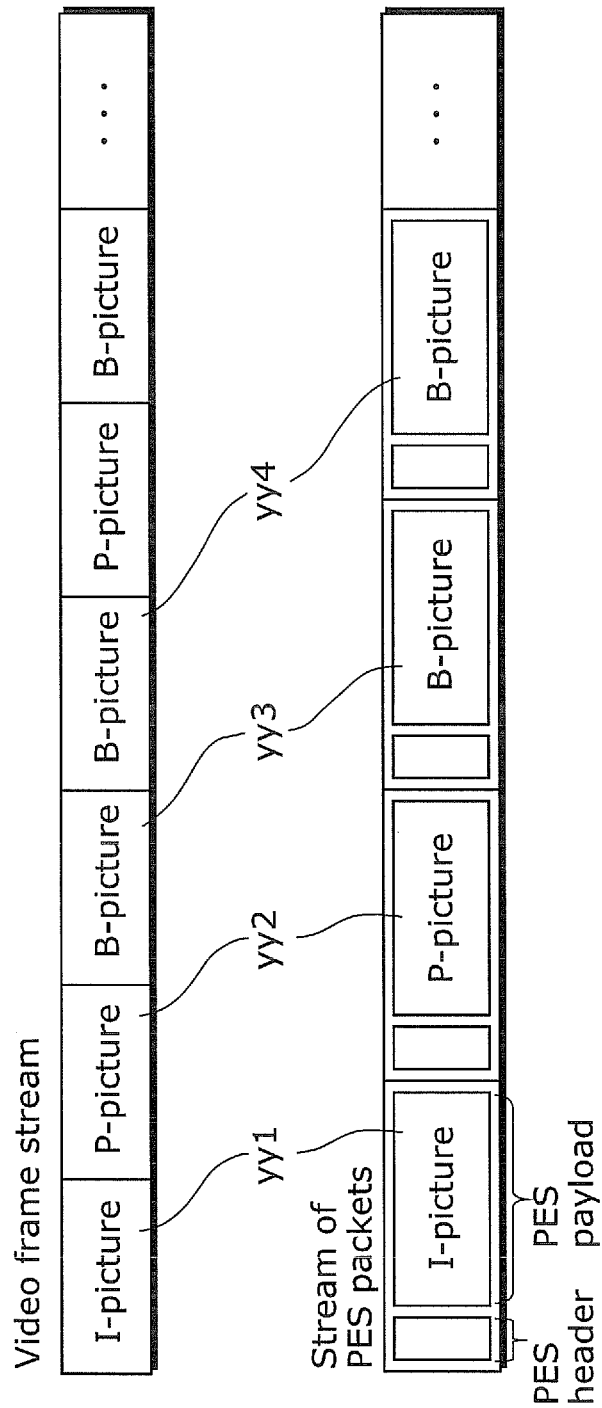
FIG. 20 shows how a video stream is stored in a stream of PES packets in more detail.

FIG. 20 illustrates how a video stream is stored in a stream of PES packets in more detail. The first bar in FIG. 20 shows a video frame stream in a video stream. The second bar shows the stream of PES packets. As indicated by arrows denoted as yy1, yy2, yy3, and yy4 in FIG. 20, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 21:
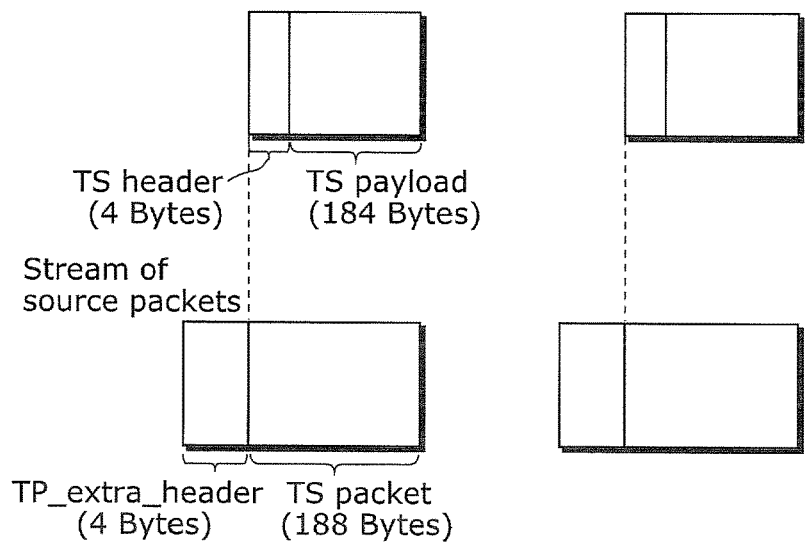
FIG. 21 shows a structure of TS packets and source packets in the multiplexed data.

FIG. 21 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively.

When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 21. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 22:
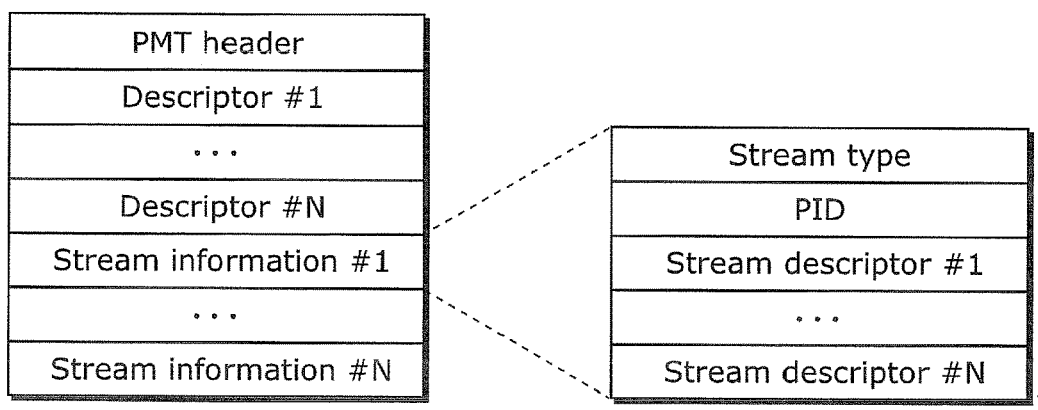
FIG. 22 shows a data structure of a PMT.

FIG. 22 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 23:
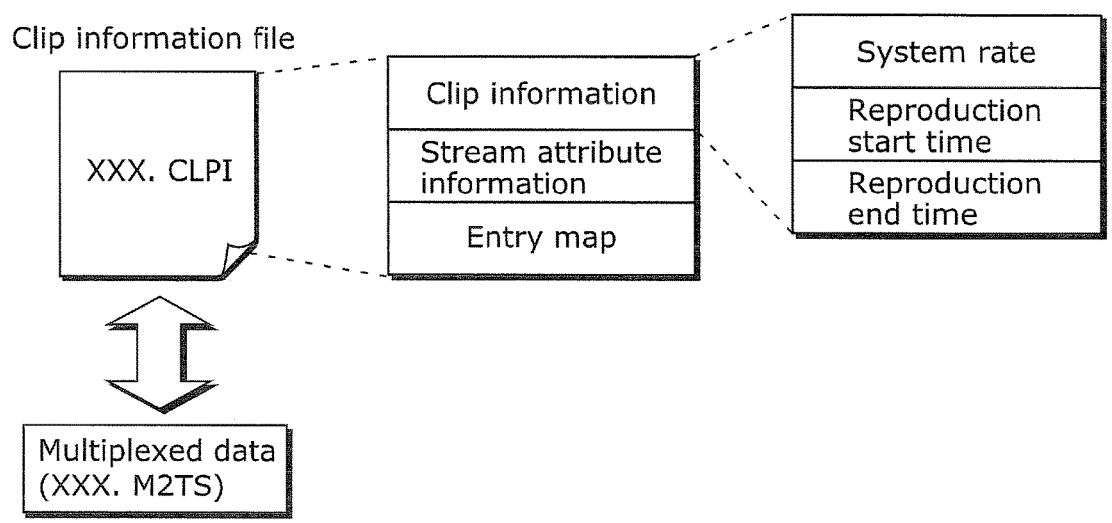
FIG. 23 shows an internal structure of multiplexed data information.

Each of the multiplexed data information files is management information of the multiplexed data as shown in FIG. 23. The multiplexed data information files are in one to one correspondence with the multiplexed data, and each of the files includes multiplexed data information, stream attribute information, and an entry map.

As illustrated in FIG. 23, the multiplexed data includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 24:
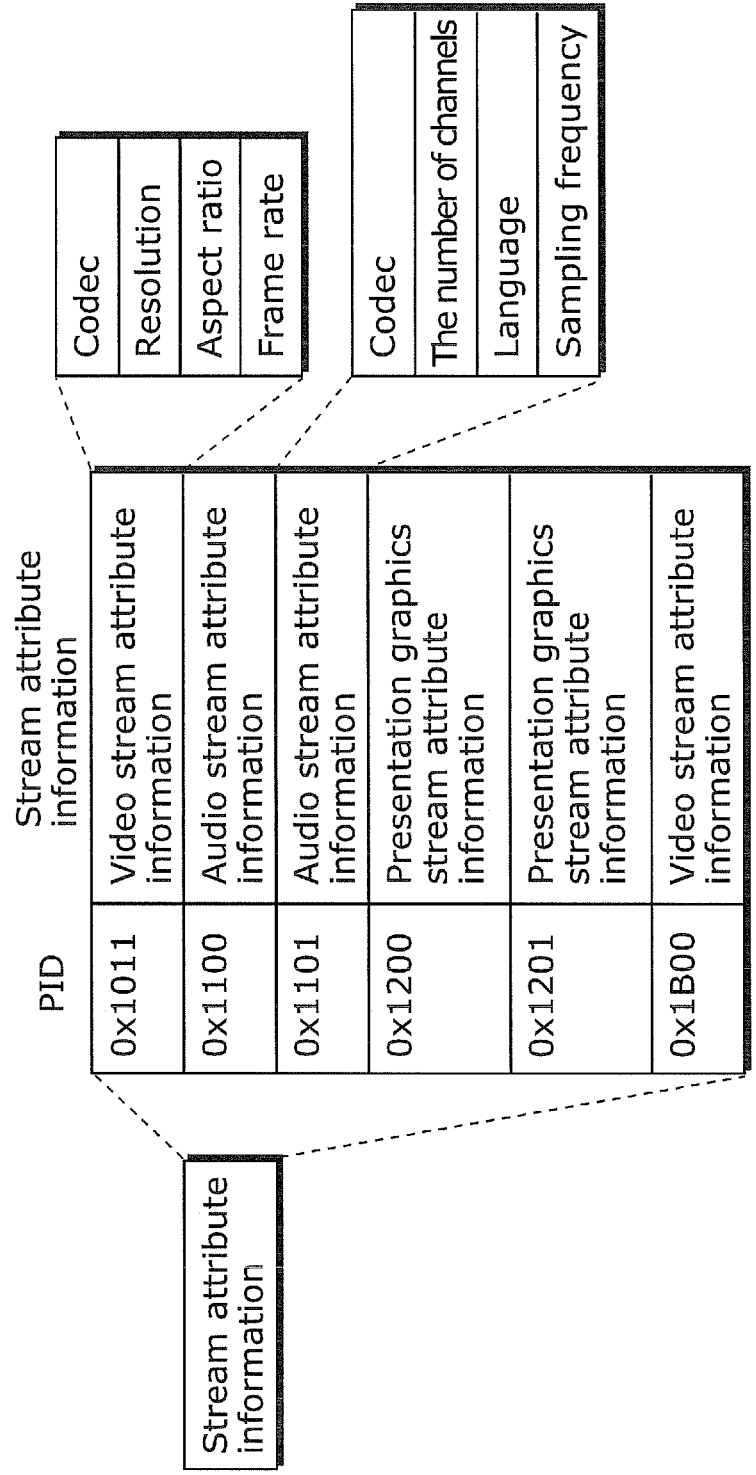
FIG. 24 shows an internal structure of stream attribute information.

As shown in FIG. 24, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of Embodiments includes a step or a unit for allocating unique information indicating video data generated by the moving picture coding method or the moving picture coding apparatus in each of Embodiments, to the stream type included in the PMT or the video stream attribute information. With the configuration, the video data generated by the moving picture coding method or the moving picture coding apparatus described in each of Embodiments can be distinguished from video data that conforms to another standard.

Figure 25:
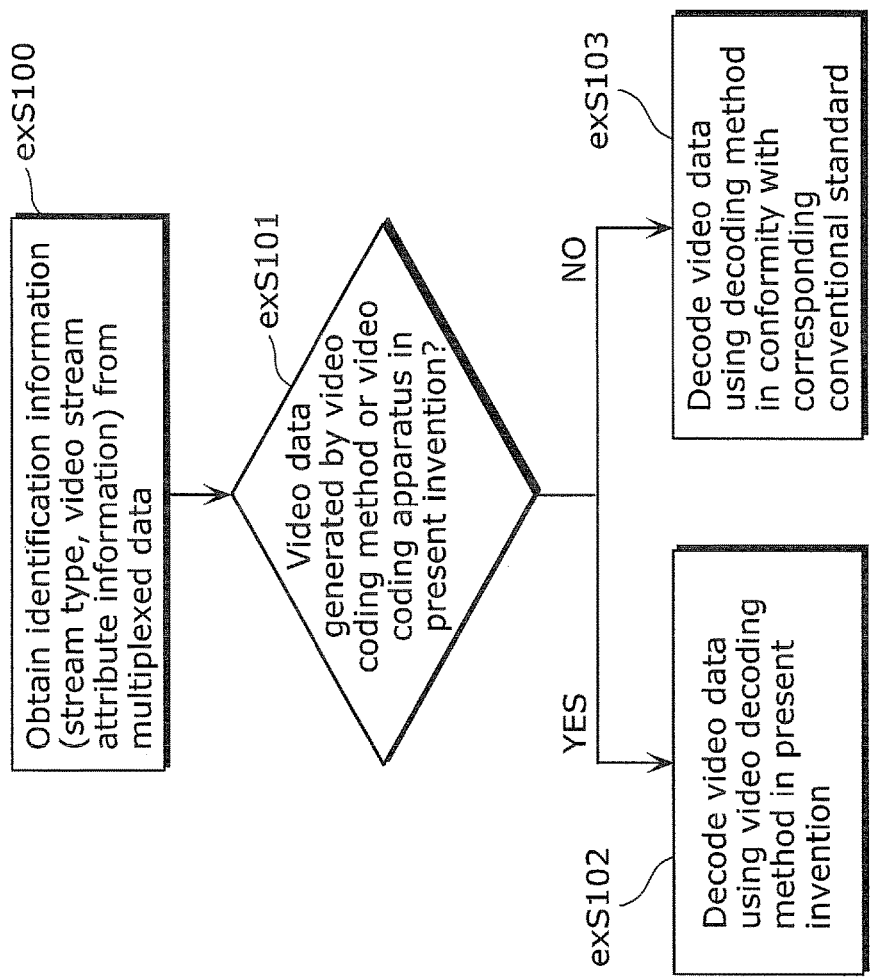
FIG. 25 shows steps for identifying video data.

Furthermore, FIG. 25 illustrates steps of the moving picture decoding method according to the present embodiment. In Step exS100, the stream type included in the PMT or the video stream attribute information is obtained from the multiplexed data. Next, in Step exS101, it is determined whether or not the stream type or the video stream attribute information indicates that the multiplexed data is generated by the moving picture coding method or the moving picture coding apparatus in each of Embodiments. When it is determined that the stream type or the video stream attribute information indicates that the multiplexed data is generated by the moving picture coding method or the moving picture coding apparatus in each of Embodiments, in Step exS102, decoding is performed by the moving picture decoding method in each of Embodiments. Furthermore, when the stream type or the video stream attribute information indicates conformance to the conventional standards, such as MPEG-2, MPEG4-AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of Embodiments can perform decoding. Even when multiplexed data that conforms to a different standard, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 5

Figure 26:
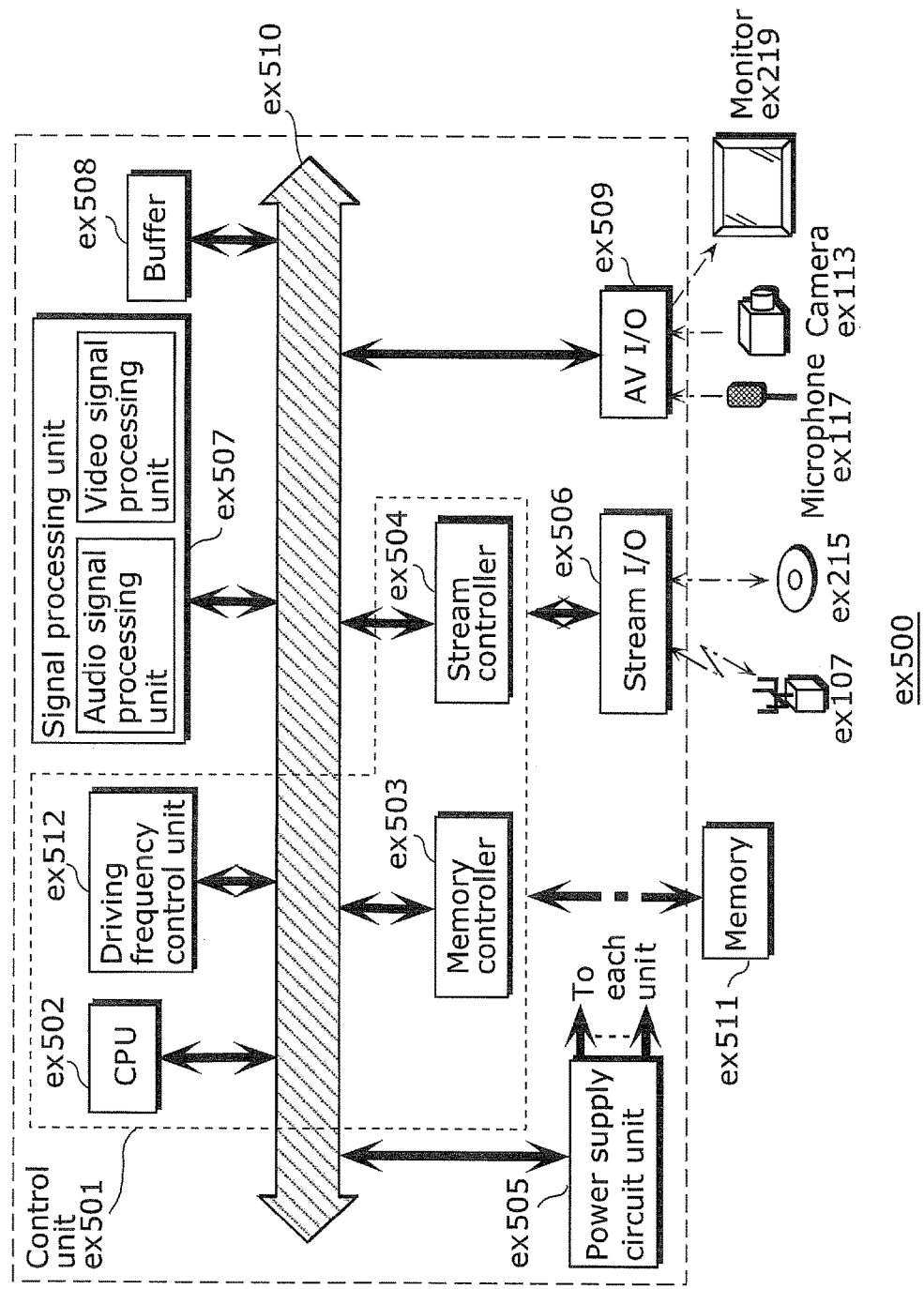
FIG. 26 shows an example of a configuration of an integrated circuit for implementing the moving picture coding method and the moving picture decoding method according to each of Embodiments.

Each of the moving picture coding method, the moving picture coding apparatus, the moving picture decoding method, and the moving picture decoding apparatus in each of Embodiments is typically achieved in the form of an integrated circuit or a Large Scale Integrated (LSI) circuit. As an example of the LSI, FIG. 26 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV JO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of Embodiments. Furthermore, the signal processing unit ex507 sometimes multiplexes the coded audio data and the coded video data, and a stream JO ex506 provides the multiplexed data outside. The provided multiplexed data is transmitted to the base station ex107, or written on the recording media ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 6

When video data generated in the moving picture coding method or by the moving picture coding apparatus described in each of Embodiments is decoded, compared to when video data that conforms to a conventional standard, such as MPEG-2, MPEG4-AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 27:
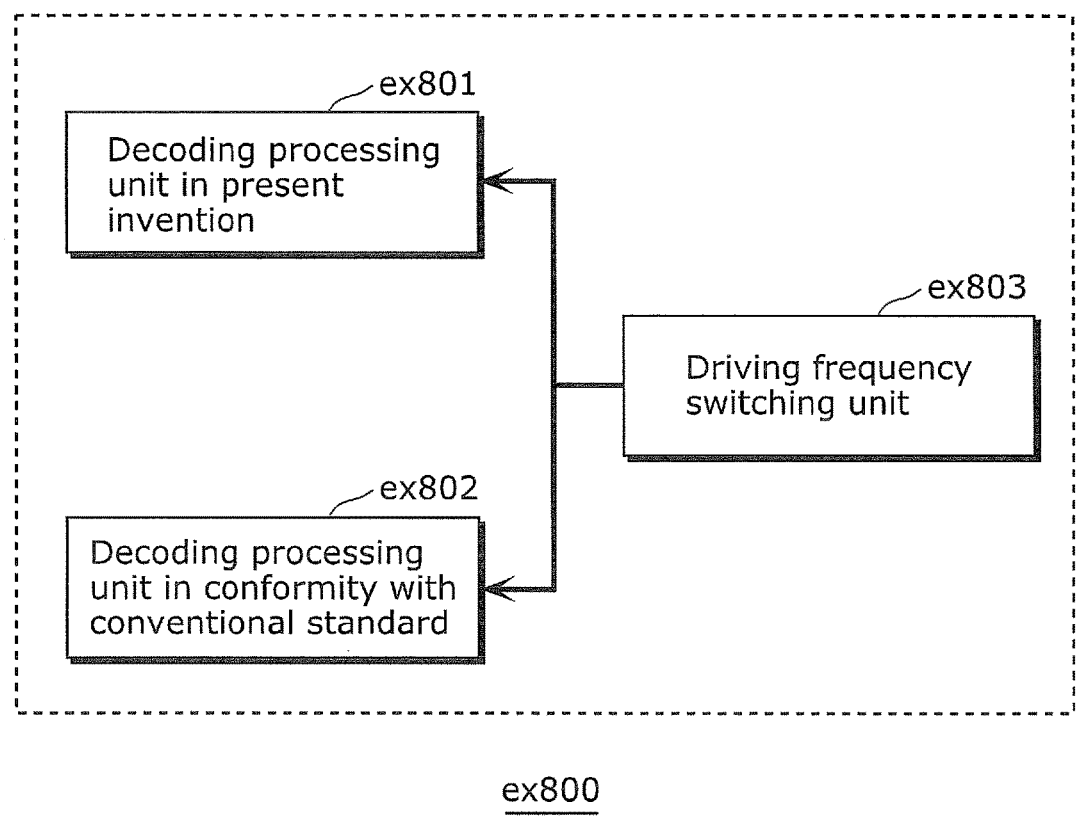
FIG. 27 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 27 illustrates a configuration ex800 in the present embodiment. A driving frequency switching unit ex803 sets a driving frequency to a higher driving frequency when video data is generated by the moving picture coding method or the moving picture coding apparatus described in each of Embodiments. Then, the driving frequency switching unit ex803 instructs a decoding processing unit ex801 that executes the moving picture decoding method described in each of Embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of Embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 26. Here, each of the decoding processing unit ex801 that executes the moving picture decoding method described in each of Embodiments and the decoding processing unit ex802 that conforms to the conventional standard corresponds to the signal processing unit ex507 in FIG. 26. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 29. The driving frequency can be selected by storing the look-up table in the buffer ex508 and in an internal memory of an LSI, and with reference to the look-up table by the CPU ex502.

Figure 28:
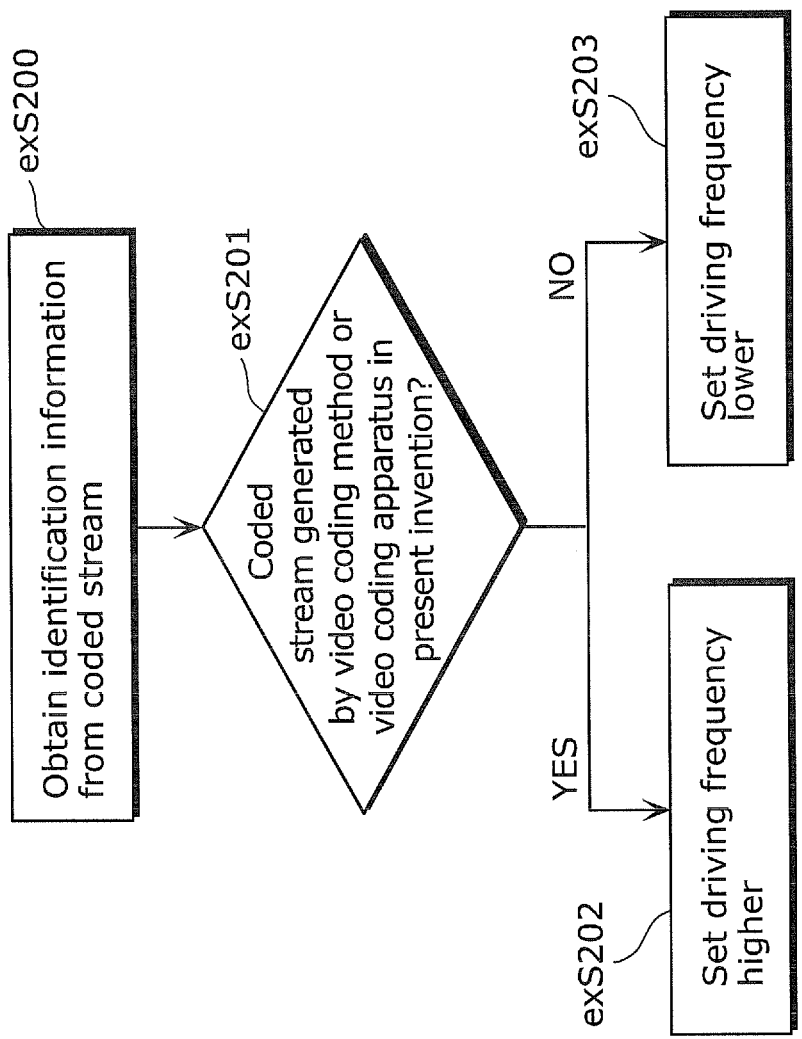
FIG. 28 shows steps for identifying video data and switching between driving frequencies.

FIG. 28 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of Embodiments, based on the identification information. When the video data is generated by the moving picture coding method and the moving picture coding apparatus described in each of Embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG4-AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of Embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG 4-AVC is larger than the processing amount for decoding video data generated by the moving picture coding method and the moving picture coding apparatus described in each of Embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of Embodiments, the voltage to be applied to the LSI ex500 or the apparatus including the LSI ex500 is probably set higher. When the identification information indicates that the video data conforms to the conventional standard, such as MPEG-2, MPEG4-AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of Embodiments, the driving of the CPU ex502 does not probably have to be suspended. When the identification information indicates that the video data conforms to the conventional standard, such as MPEG-2, MPEG4-AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of Embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG4-AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 7

There are cases where a plurality of video data that conforms to different standards, is provided to the devices and systems, such as a television and a mobile phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of Embodiments and the decoding processing unit that conforms to the conventional standard, such as MPEG-2, MPEG4-AVC, and VC-1 are partly shared. Ex900 in FIG. 30A shows an example of the configuration. For example, the moving picture decoding method described in each of Embodiments and the moving picture decoding method that conforms to MPEG4-AVC have, partly in common, the details of processing, such as entropy coding, inverse quantization, deblocking filtering, and motion compensated prediction. The details of processing to be shared probably include use of a decoding processing unit ex902 that conforms to MPEG4-AVC. In contrast, a dedicated decoding processing unit ex901 is probably used for other processing unique to the present invention. Since the present invention is characterized by intra prediction processing in particular, for example, the dedicated decoding processing unit ex901 is used for intra prediction processing. Otherwise, the decoding processing unit is probably shared for one of the entropy coding, inverse quantization, deblocking filtering, and motion compensation, or all of the processing. The decoding processing unit for implementing the moving picture decoding method described in each of Embodiments may be shared for the processing to be shared, and a dedicated decoding processing unit may be used for processing unique to that of MPEG4-AVC.

Furthermore, ex1000 in FIG. 30B shows another example in that processing is partly shared. This example uses a configuration including a dedicated decoding processing unit ex1001 that supports the processing unique to the present invention, a dedicated decoding processing unit ex1002 that supports the processing unique to another conventional standard, and a decoding processing unit ex1003 that supports processing to be shared between the moving picture decoding method in the present invention and the conventional moving picture decoding method. Here, the dedicated decoding processing units ex1001 and ex1002 are not necessarily specialized for the processing of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method in the present invention and the moving picture decoding method in conformity with the conventional standard.

INDUSTRIAL APPLICABILITY

The moving picture coding method and the moving picture decoding method according to the present disclosure are capable of being applied to any multimedia data and improving a compression rate. For example, they are suitable as the moving picture coding method and the moving picture decoding method for accumulation, transmission, communications, and the like using mobile telephones, DVD apparatuses, personal computers, and the like.

The invention claimed is:

1. A moving picture decoding apparatus that decodes a current block, the moving picture decoding apparatus comprising:
   a processor; and
   a non-transitory storage, the processor performing, using the non-transitory storage, processes including:
      deriving a first motion vector candidate, the first motion vector candidate being a first motion vector that has been used to decode a first block;
      deriving a second motion vector candidate, the second motion vector candidate being a second motion vector that has been used to decode a second block that is different from the first block;
      generating a new candidate, the new candidate being a combination of the first motion vector candidate and the second motion vector candidate; and
      decoding the current block by using a candidate from among a plurality of candidates including the new candidate.

2. The moving picture decoding apparatus of claim 1, wherein the first motion vector candidate is included in a first candidate list, and the second motion vector candidate is included in a second candidate list.

3. The moving picture decoding apparatus of claim 1, wherein the first motion vector candidate and the second motion vector candidate refer to a same reference frame.

4. The moving picture decoding apparatus of claim 1, wherein the first block is adjacent to the current block, and the second block is adjacent to the current block.

5. A moving picture decoding method for decoding a current block, the moving picture decoding method comprising:
   deriving a first motion vector candidate, the first motion vector candidate being a first motion vector that has been used to decode a first block;
   deriving a second motion vector candidate, the second motion vector candidate being a second motion vector that has been used to decode a second block that is different from the first block;
   generating a new candidate, the new candidate being a combination of the first motion vector candidate and the second motion vector candidate; and
   decoding the current block by using a candidate from among a plurality of candidates including the new candidate.

6. A non-transitory computer readable recording medium having stored thereon executable instructions, which when executed, cause a processor to perform a moving picture decoding method including:
   deriving a first motion vector candidate, the first motion vector candidate being a first motion vector that has been used to decode a first block;
   deriving a second motion vector candidate, the second motion vector candidate being a second motion vector that has been used to decode a second block that is different from the first block;
   generating a new candidate, the new candidate being a combination of the first motion vector candidate and the second motion vector candidate; and
   decoding the current block by using a candidate from among a plurality of candidates including the new candidate.

* * * * *

UNITED STATES PATENT AND TRADEMARK OFFICE
CERTIFICATE OF CORRECTION

PATENT NO. : 10,536,712 B2
APPLICATION NO. : 16/232441
DATED : January 14, 2020
INVENTOR(S) : Toshiyasu Sugio Page 1 of 1

It is certified that error appears in the above-identified patent and that said Letters Patent is hereby corrected as shown below:

On the Title Page

Item (56), page 3, Column 2, Line 45, "1330976" should read --I330976--;

Item (56), page 3, Column 2, Line 47, "1259726" should read --I259726--;

Item (56), page 3, Column 2, Line 48, "1264227" should read --I264227--;

Item (56), page 3, Column 2, Line 50, "1317107" should read --I317107--;

Item (56), page 3, Column 2, Line 51, "1325281" should read --I325281--;

Item (56), page 3, Column 2, Line 54, "1331877" should read --I331877--; and

Item (56), page 3, Column 2, Line 55, "1335183" should read --I335183--.

Signed and Sealed this
Fourteenth Day of April, 2020

Andrei Iancu
*Director of the United States Patent and Trademark Office*